United States Patent
Eder

(10) Patent No.: US 7,523,065 B2
(45) Date of Patent: Apr. 21, 2009

(54) RISK TRANSFER SUPPLY CHAIN SYSTEM

(75) Inventor: Jeffrey Scott Eder, Mill Creek, WA (US)

(73) Assignee: Asset Trust, Inc., Bothell, WA (US)

( * ) Notice: Subject to any disclaimer, the term of this patent is extended or adjusted under 35 U.S.C. 154(b) by 362 days.

(21) Appl. No.: 10/012,374

(22) Filed: Dec. 12, 2001

(65) Prior Publication Data

US 2005/0119919 A1    Jun. 2, 2005

(51) Int. Cl.
G06Q 99/00    (2006.01)

(52) U.S. Cl. .............................. 705/38; 705/36; 705/35

(58) Field of Classification Search ................... 705/35, 705/38, 26, 36
See application file for complete search history.

(56) References Cited

U.S. PATENT DOCUMENTS

| | | | |
|---|---|---|---|
| 3,749,892 A | 7/1973 | Stenning | |
| 3,933,305 A | 1/1976 | Murphy | |
| 4,839,304 A | 6/1989 | Roberts et al. | |
| 4,989,141 A | 1/1991 | Lyons | |
| 5,128,861 A | 7/1992 | Kagami | |
| 5,148,365 A | 9/1992 | Dembo | |
| 5,191,522 A | 3/1993 | Bosco et al. | |
| 5,193,055 A | 3/1993 | Brown | |
| 5,224,034 A | 6/1993 | Katz | |
| 5,237,495 A | 8/1993 | Morii | |
| 5,237,946 A | 8/1993 | Kagami | |
| 5,317,504 A | 5/1994 | Nakayama | |
| 5,361,201 A | 11/1994 | Jost et al. | |
| 5,406,477 A | 4/1995 | Harhen | |
| 5,414,621 A | 5/1995 | Hough | |
| 5,471,611 A | 11/1995 | McGregor | |
| 5,638,492 A | 6/1997 | Maeda et al. | |
| 5,644,727 A | 7/1997 | Atkins | |
| 5,649,181 A | 7/1997 | French et al. | |
| 5,668,951 A | 9/1997 | Shintani | |
| 5,680,305 A | 10/1997 | Agpar | |
| 5,704,045 A | 12/1997 | King et al. | |
| 5,704,055 A | 12/1997 | George et al. | |
| 5,706,495 A | 1/1998 | Chadha et al. | |
| 5,737,581 A | 4/1998 | Keane | |
| 5,742,775 A * | 4/1998 | King | ......................... 395/238 |

(Continued)

FOREIGN PATENT DOCUMENTS

| | | |
|---|---|---|
| EP | 0 587 290 A2 | 3/1994 |
| GB | 2 253 081 A | 2/1992 |
| JP | 2003263212 A * | 9/2003 |
| WO | WO983-8588 | 2/1997 |

OTHER PUBLICATIONS

Zipp, Alan S.; Business valuation methods; 1993, AICPA.

(Continued)

*Primary Examiner*—Pierre E. Elisca

(57) ABSTRACT

An automated method and system (100) for supplying risk transfer products to a client company on a continual basis. After the client company provides data to the risk transfer supply chain, swaps and/or insurance products that provide the desired risk transfer are identified and priced. The information regarding the proposed risk transfer swaps and products is optionally reviewed by the user (20) and optionally accepted. If accepted, the transaction is completed in an automated fashion. Prices and contingent capital purchases are established as required to keep the operator of the risk transfer supply chain in compliance with regulatory reserve requirements.

41 Claims, 11 Drawing Sheets

U.S. PATENT DOCUMENTS

| | | | |
|---|---|---|---|
| 5,761,442 | A | 6/1998 | Barr |
| 5,774,873 | A | 6/1998 | Berent |
| 5,794,219 | A | 8/1998 | Brown |
| 5,799,287 | A | 8/1998 | Dembo |
| 5,802,501 | A | 9/1998 | Graff |
| 5,809,282 | A | 9/1998 | Cooper |
| 5,812,987 | A | 9/1998 | Luskin et al. |
| 5,812,988 | A | 9/1998 | Sandretto |
| 5,819,237 | A | 10/1998 | Garman |
| 5,875,431 | A | 2/1999 | Heckman et al. |
| 5,887,120 | A | 3/1999 | Wicaly |
| 6,026,397 | A | 2/2000 | Sheppard |
| 6,064,971 | A | 5/2000 | Hartnett |
| 6,064,972 | A | 5/2000 | Jankowitz et al. |
| 6,073,115 | A | 6/2000 | Marshall |
| 6,078,901 | A | 6/2000 | Ching |
| 6,092,056 | A | 7/2000 | Tull, Jr. et al. |
| 6,112,188 | A | 8/2000 | Harnett |
| 6,125,355 | A | 9/2000 | Bekaert et al. |
| 6,134,536 | A * | 10/2000 | Shepherd ............... 705/37 |
| 6,148,293 | A * | 11/2000 | King ............... 705/35 |
| 6,173,276 | B1 | 1/2001 | Kant |
| 6,189,011 | B1 | 2/2001 | Lim et al. |
| 6,209,124 | B1 | 3/2001 | Vermeire et al. |
| 6,249,768 | B1 | 6/2001 | Tulskie |
| 6,263,314 | B1 | 7/2001 | Donner |
| 6,278,981 | B1 * | 8/2001 | Dembo et al. ............ 705/36 R |
| 6,282,531 | B1 | 8/2001 | Haughton |
| 6,301,584 | B1 * | 10/2001 | Ranger ............... 707/103 R |
| 6,324,553 | B1 | 11/2001 | Agrawal et al. |
| 6,330,564 | B1 | 12/2001 | Hellerstein et al. |
| 6,332,163 | B1 | 12/2001 | Bowman-Amuah |
| 6,347,306 | B1 | 2/2002 | Swart |
| 6,366,934 | B1 | 4/2002 | Cheng et al. |
| 6,418,448 | B1 | 7/2002 | Sarkar |
| 6,453,297 | B1 | 9/2002 | Burks et al. |
| 6,456,982 | B1 | 9/2002 | Pilipovic |
| 6,546,381 | B1 | 4/2003 | Subramanian |
| 6,584,507 | B1 | 6/2003 | Bradley et al. |
| 6,591,232 | B1 | 7/2003 | Kassapoglou |
| 6,671,773 | B2 | 12/2003 | Baseman et al. |
| 6,684,193 | B1 | 1/2004 | Chavez et al. |
| 6,732,095 | B1 | 5/2004 | Warshavsky et al. |
| 6,738,753 | B1 | 5/2004 | Hogan |
| 6,757,689 | B2 | 6/2004 | Battas et al. |
| 6,795,811 | B1 | 9/2004 | Epstein |
| 6,836,773 | B2 | 12/2004 | Tamayo et al. |
| 6,876,992 | B1 | 4/2005 | Sullivan |
| 6,909,708 | B1 | 6/2005 | Krishnaswamy et al. |
| 6,996,811 | B2 | 2/2006 | Nishioka et al. |
| 7,006,992 | B1 | 2/2006 | Packwood |
| 7,167,837 | B1 | 1/2007 | Ciampi et al. |
| 7,177,822 | B2 | 2/2007 | Mahmood et al. |
| 7,242,856 | B2 | 7/2007 | Ishida et al. |
| 7,243,081 | B2 | 7/2007 | Friend et al. |
| 7,249,004 | B2 | 7/2007 | Lindeman et al. |
| 7,249,089 | B2 | 7/2007 | Mendizabal et al. |
| 7,272,820 | B2 | 9/2007 | Klianev |
| 2002/0002520 | A1 | 1/2002 | Gatto |
| 2002/0016758 | A1 | 2/2002 | Grigsby |
| 2002/0023034 | A1 | 2/2002 | Brown et al. |
| 2002/0052820 | A1 | 5/2002 | Gatto |
| 2003/0069986 | A1 | 4/2003 | Petrone et al. |
| 2003/0083793 | A1 | 5/2003 | Horsfall |

OTHER PUBLICATIONS

Davidow, William; Accounting systems are completely wrong, Jan. 1995,Red Herring.

McTaggert, James, Kontes, Peter and Mankins, Michael, The value imperative, 1994,The Free Press.

Rappaport, Alfred; Creating shareholder value; 1986, The Free Press.

Ritchken, Peter, Options, Theory, Strategy and Applications, 1987, Foresman and Company.

Dixit, Avinash & Pindyck, Robert; Investment under uncertainty; 1994; Princeton University Press.

Garson, David; Interpreting neural network connection weights, Apr. 1, 1991, AI Expert.

Wellstead, Stephen; Neural network and fuzzy logic applications in C/C++; 1994; John Wiley & Sons.

Most, Kenneth; Accounting theory; 1977,Grid, Inc.

Hendriksen, Elden, Accounting theory, 1982, Richard D. Irwin.

Kulkarni, Arun; Artificial neural networks for image understanding; Jan. 1, 1994; Van Norstrand Reinhold.

Ward Systems Group; NeuroWindows User Manual; 1993; Wards Systems Group.

Brealey, Richard & Myers, Stewart; Principles of Corporate Finance; 1991; McGraw Hill.

Faulkner, Terrence; Applying options thinking to R&D valuation; May 1, 1996; Research Technology Manage.

Miller, Merton & Modigliani, Franco, Dividend policy, growth and the valuation of shares, Oct. 1, 1961.

Simensky, Melvin & Bryer, Lanning; The new role of intellectual property in commercial transactions.

Wilson, Albert, Emerging approaches to impaired property valuation, Apr. 1, 1996, Appraisal Journal, v64.

Brown, Gordon T, Free cash flow appraisal, a better way, Apr. 1, 1996, Appraisal Journal, V64, No. 2.

Business Editors & Real Estate Industry Writers, EQK Realty Investors I, Apr. 2, 1992, Press Release.

Swad, Randy, Business valuation, applicable standards for CPA's, Sep. 1, 1995, CPA Journal v65, No. 9.

Reilly, Robert; Valuation of intangibles for bankruptcy and reorganization purposes; Aug. 1, 1994; Ohio.

Liebich, Kim; How to value a bank; Aug. 1, 1995; ABA Banking Journal.

Baumann, Barbara H & Oxaal, Marjorie R; Estimating the value of a group medical practice, a primer.

Maxson, Mark; Will you get your money's worth?, May 1, 1993, Financial Executive.

Friedman, Richard; Business valuation: calculating it right; Oct. 1, 1994; Practical Accountant.

Mullen, Maggie; How to value intangibles; Nov. 1, 1993; Accountancy.

Stewart, Thomas; Trying to grasp the intangible; Oct. 2, 1995 Fortune.

Ourosoff, Alexandra; What the world's top brands are worth; Sep. 1, 1992; Finance World.

Phillips Business Information, Inc.; Five ways to reduce risk with neural networks; Sep. 27, 1993; Credi.

Lippitt, Jeffrey & Mastracchio, Nicholas, Developing capitalization rates for valuing a business, 11.

Hirsch, A. Ethan, What's it worth?, Dec. 21, 1992, Accounting Today, v6, No. 24, p. 16.

Myers, Stewart & Howe, Christopher; A life-cycle financial model of Pharmaceutical R&D; Apr. 1, 1997;MIT.

Simon, Carol J. & Sullivan, Mary W.; The Measurement and Determinants of Brand Equity; Oct. 1, 1993; Ma.

Sveiby, Karl Erik & Mellander, Klas; Tango Learning Guide Version 2.1; 1994; Celemi.

Kaufman, J. Jerry; Value Management; 1998; Crisp.

HBS Press; Measuring Corporate Performance; 1998; HBS Press.

Kaplan, Robert & Norton, David; The Balanced Scorecard; 1996; HBS Press.

Morris, Henry; Extending the Business Process, Oct. 6, 1998, IDC Presentation.

Amir, Eli; & Lev, Baruch, "Value-relevance of non-financial information", Journal of Accounting and.

Ernst & Young, Measures that Matter.

Bouquet, Paolo, Searafini, Luciano, et al; Modeling and Using Context—Context 99, Sep. 1999, Springer.

Akman, Varol, Bouquet, Paolo, et al; Modeling and Using Context—Context 2001, Jul. 2001, Springer.

Kuehne, Sven, et al, "SEQL: Category learning as progressive abstraction using structure mapping", 2.
Franke, Jurgen, Hardle, Wolfgang, et al; Measuring Risk in Complex Stochastic Systems; 2000, Springe.
Shimpi, Prakash, Integrating Corporate Risk Management, Oct. 1999, Swiss Re New Markets.
Brewka, Gerhard, Principles of Knowledge Representation, 1996, CSLI Publications.
Reiter, Raymond, Knowledge in Action, 2001, MIT Press.
Tissen, Rene, Andriessen, Daniel, et al; The Knowledge Dividend, 2000, Prentice Hall.
Brown, John Seely, et al, Loosening up: How process networks unlock the power of specialization, 20.
Blythe, Jim, "An Integrated Environment for Knowledge Acquisition", 2001, Intelligent User Interface.
Kluge, Jurgen, Stein, Wolfram, Licht, Thomas, Knowledge Unplugged, 2001, Palgrave.
Quinn, James Brian, Intelligent Enterprise, Free Press, 1992.
Fowler, Martin; Analysis Patterns: Reusable Object Models, 1997, Addison Wesley.
Hancock, John, Huber, Peter, Koch, Pablo, The economics of insurance, 2001, Swiss Re Press.
Fahy, Martin, Strategic Enterprise Management Systems, 2001, CIMA.
Shafer, Glenn & Vovk, Vladimir, Probability and Finance, 2001, John Wiley & Sons.
Pfeffer, Avi, "A Bayesian Language for Cumulative Learning", 2000, AAII.
Clark, Peter, et al, "Knowledge entry as graphical assembly of components", 2001, K-Cap 01.
Upton, Wayne, "Special Report: Business and Financial Reporting, Challenges of the New Economy," FAS.
Davidow, William, "Accounting systems are completely wrong", The Red Herring, Jan. 1995, p. 91.
Hayes, Robert & Abernathy, William, "Managing our way to economic decline", Harvard Business Review.
Modigliana, Franco & Miller, Merton, "Dividend Policy, Growth and the Valuation of Shares", Journal.
Simon, Carol & Sullivan, Mary, "A Financial Approach to estimating firm level brand equity", 92-116.
Alexander, Carol, Risk Management and Analysis, John Wiley & Sons, 1998.
Farquhar, Peter & Han, Julie, "Recognizing and measuring your brand assets" 91-119, Mkt. Sci. Inst.
"The future of finance", The Economist, Dec. 11, 1999, pp. 71-72.
Baghai, Mehrdad, Coley, Stephen & White, David, "The Alchemy of Growth", Perseus Books, 1999.
Hull, John C., Options, futures and other derivatives, 2000, Prentice Hall.
Anonymous, "Survey: Too Clever by Half", The Economist, Jan. 24, 2004.
Caouette, John, Altman, Edward & Narayanan, Paul, Managing Credit Risk, John Wiley and Sons, Inc.
Dowd, Kevin, Beyond Value at Risk, 1998, John Wiley & Sons.
Lohr, Steve, "Gates Tries to Lure Future Techies", International Herald Tribune, Mar. 2, 2004.
Halford, Graeme, "How many variables can humans process". Psychological Science, Jan. 1, 2005.
Hildenbrand, Carol, "Putting two and two together", Darwin Magazine, Jan. 1, 2002.
W3C, "Extensible Markup Language (XML)", W3C web site, Apr. 14, 2005.
Goldfarb, Charles: & Prescod, Paul: XML Handbook: Prentice Hall. 1998.
Maier, David, "Database Desiderata for an XML Query Language"; W3.org, 1998.
Widom, Jennifer, "Data Management for XML, Research Directions", IEEE. Jul. 1999.
Brisys, Eric, Insurance from underwriting to derivatives, John Wiley & Sons, 2001.
Culp, Christopher et al, "Value at Risk for Asset Managers", Derivatives Quarterly, vol. 5, Jan. 8, 1999.
Chicago Mercantile Exchange. "SPAN—Frequently Asked Questions", CME web site, Feb. 17, 2006.
Chicago Board of Trade, "SPAN Margin System", Aug. 27, 1991.
Mauboussin, Michael, "Get Real", CSFB, Jun. 23, 1999.
Copeland, Tom: Koller, Tim: Murrin, Jack: Valuation, John Wiley & Sons, 1996.
Brown, Carol & Phillips, Mary Ellen, Expert Systems for Management Accounting Tasks, IMA, 1995.
The Appraisal Foundation, Uniform Standards of Professional Appraisal Practice, 1997.
Chambers, Robert: Quiggins, John: "Resource Allocation and Asset Pricing", Nov. 2002.
Haesendonckx, Michel, "VBM—Value Driver Tree", Jun. 8, 2005.
Barua, Anitesh; Lee, C.H. Sophie: Whinston, Andrew, "The Calculus of Reengineering", Aug. 1994.
Everest, Gordon, Database Management, McGraw Hill, 1986.
Siegel, Jeremy, "The Noisy Market Hypothesis", Wall Street Journal, Jun. 14, 2006.
Koller, Timothy, "What is value based management", McKinsey Quarterly, 1994, No. 3.
Brown, Carol; Coakley, James; Phillips, Mary Ellen,Neural Networks Enter World of Mgmt Accounting.
Bielinski, Daniel, "How to sort out the premium drivers of post deal value", Mergers & Acquisitions.
Bergstrom, Peter; Kimber Eliot, "Formal data models for SGML and HyTime", SGML, Mar. 1999, electrum.
Harold, Elliotte, XML Bible, IDG Books, 1999.
Knight, James, Value Based Management, McGraw Hill, 1998.
NeuroSolutions, Applications Summaries.
Ballow, John; Burgman, Roland;Burgoz, Scott; "Enhanced Business Reporting"; Oct. 2004, pp. 1-30, Asset Economics, U.S.A.
Charoenrook, Anchanda; "Does Sentiment Matter?"; Dec. 2003, pp. 1-44, Financial Management Association International, U.S.A.
Bandopadhyaya, Arindam, Jones, Anne Leah; "Measuring Investor sentiment in equity markets"; Feb. 2006, v7, pp. 208-215, Journal Asset Management, U.S.A.
Physorg.com, "How much information is too much information?"; pp. 1-2;, Feb. 15, 2005, PHYSORG.COM, University of Queensland, Australia.
Yang, Bo et al., BP Neural Network Optimization based on an improved genetic algorithm, Nov. 4, 2002, pp. 64-68, Proceedings for the First International Conference on Machine Learning and Cybernetics Beijing, China, IEEE, U.S.A.
Roll, Richard, "A Mean/Variance Analysis of Tracking Error", pp. 13-22, V18, Summer 1992, Journal of Portfolio Management, U.S.A.
Myers, Randy, "Measure for Measure", Nov. 1, 1997, pp. 31-37, CFO Magazine, U.S.A.
Biddle,Gary; Bowen, Robert; Wallace, James; "Does EVA Beat Earnings?", pp. 301-336, V24 Dec. 1997, Journal of Accounting and Economics, U.S.A.
Eder,Jeff, Hard facts about soft assets (and real options), Apr. 3, 2001, pp. 1-54, Casualty Actuary Society Seminar on Enterprise Risk Management, U.S.A.
Wikipedia, "Cholesky Decomposition", Aug. 1, 2007, en.wikipedia,org.
Wikipedia, "Symmetric Matrix", Sep. 14, 2007, en.wikipedia,org.
Green, Paul & Krieger, Anna; "Models and Heuristics for Product Line Selection", Marketing Science, vol. 4, No. 1, pp. 1-19, Winter 1995, U.S.A.

* cited by examiner

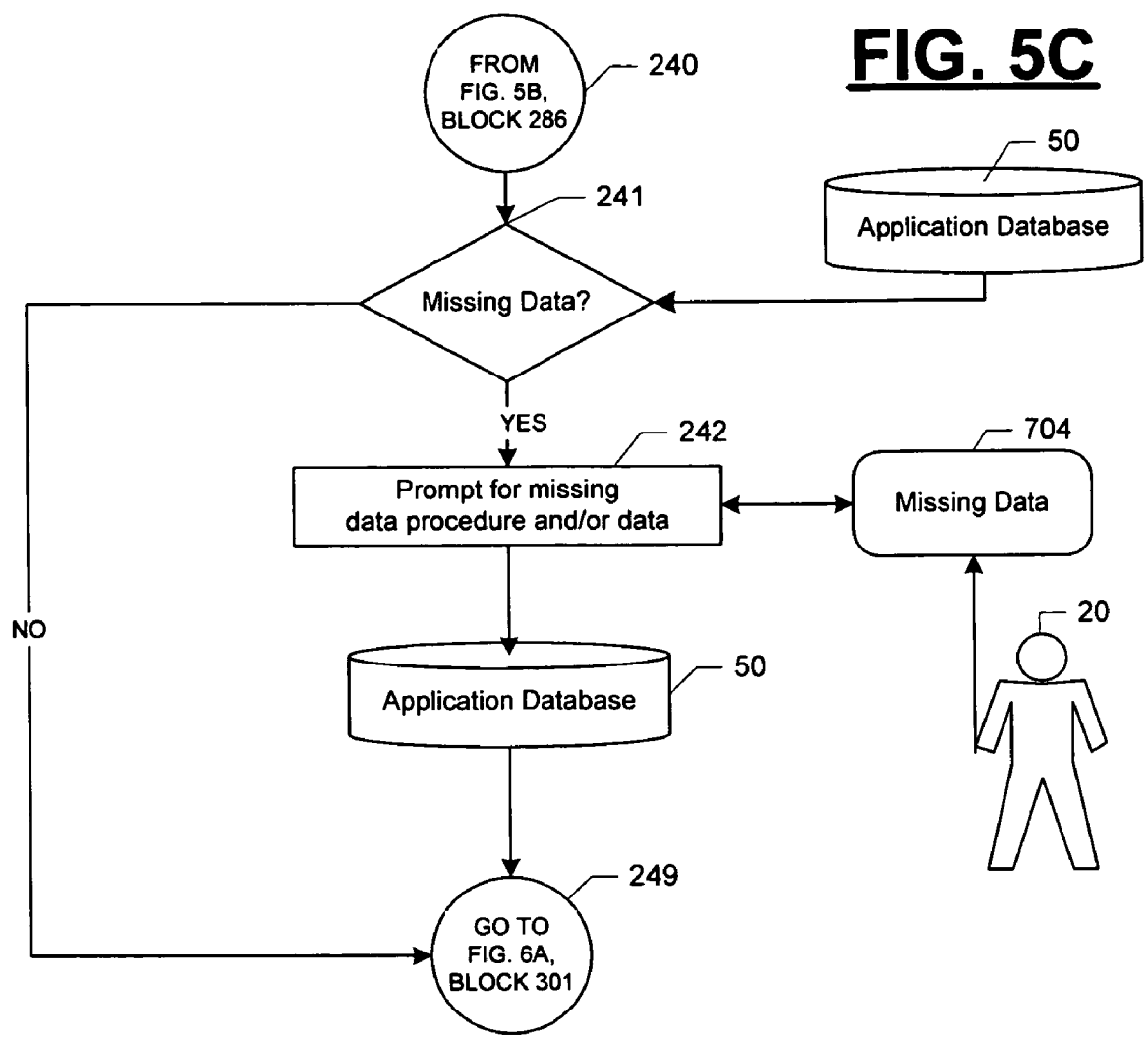

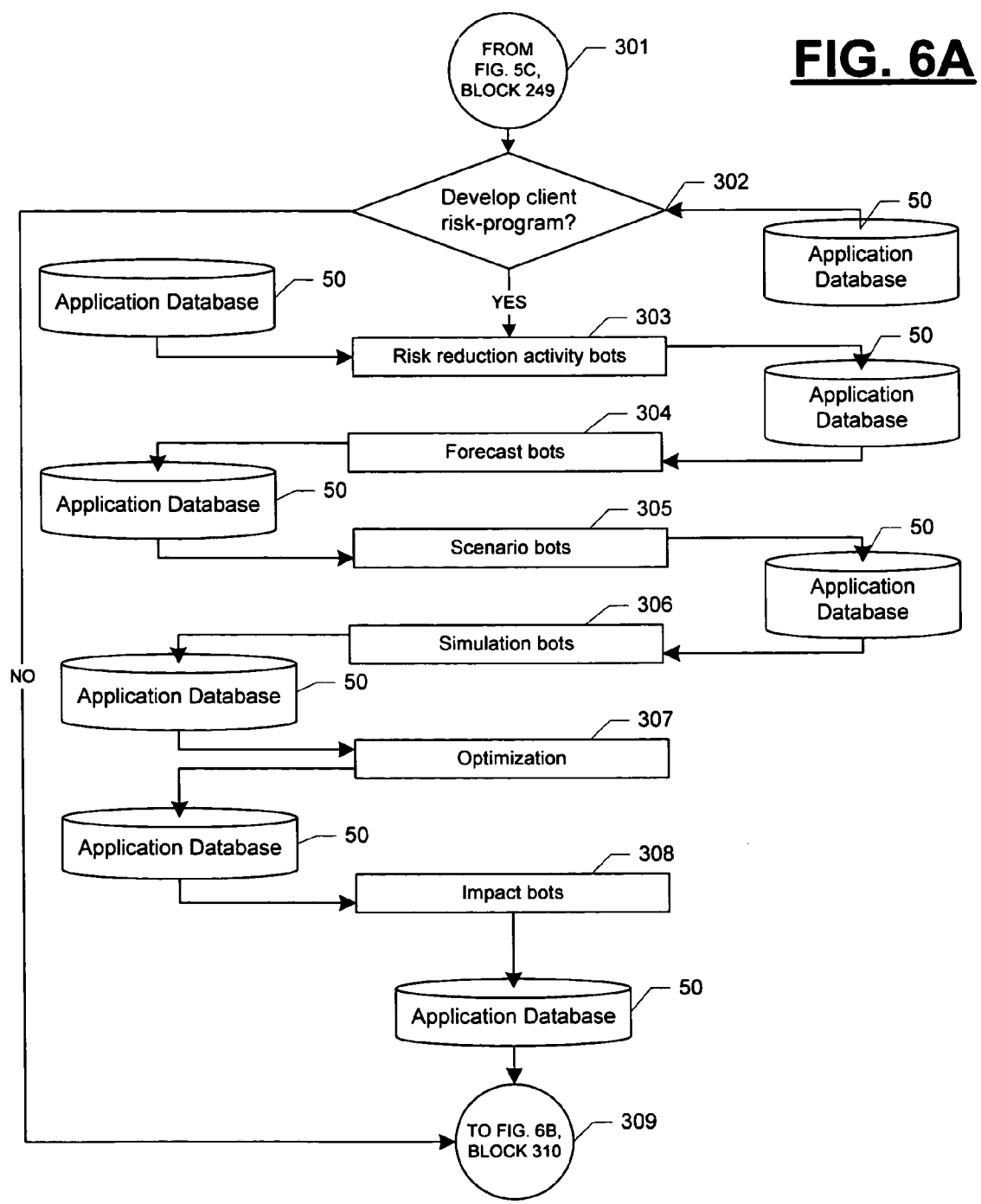

Risk #1

Risk #2

Risk #3

Combined Risk

RISK TRANSFER SUPPLY CHAIN SYSTEM

CROSS REFERENCE TO RELATED APPLICATIONS

The subject matter of this application is related to the subject matter of application Ser. No. 09/994,740 filed Nov. 28, 2001 the disclosure of which is incorporated herein by reference. Application Ser. No. 09/994,740 is a continuation in part of application Ser. No. 09/953,148 filed Sep. 17, 2001, application Ser. No. 09/775,561 filed Feb. 5, 2001 and application Ser. No. 09/688,983 filed Oct. 17, 2000 the disclosures of which are incorporated herein by reference. The subject matter of this application is also related to the subject matter of U.S. Pat. No. 5,615,109 for "Method of and System for Generating Feasible, Profit Maximizing Requisition Sets", U.S. Pat. No. 6,393,406 "Method of and System for Valuing Elements of a Business Enterprise" and U.S. Pat. No. 6,321,205 "Method of and System for Modeling and Analyzing Business Improvement Programs" by Jeff S. Eder, the disclosures of which are incorporated herein by reference.

BACKGROUND OF THE INVENTION

This invention relates to a method of and system for developing and continuously operating an automated, on-line risk transfer supply chain system.

SUMMARY OF THE INVENTION

It is a general object of the present invention to provide a novel and useful system for supplying on-line risk transfer.

A preferable object to which the present invention is applied is analyzing and then satisfying the risk transfer needs for client companies in an automated fashion. Provision of this service is completed by performing a series of inter-related steps including:

1) obtaining a view of the risks faced by client companies under a variety of scenarios;
2) optionally using the information obtained in step one to develop the optimal risk reduction program for each client company within the constraints imposed by client company liquidity and the client company management team (note: this step is optional because the client company may have already identified and transmitted their optimal risk reduction program as part of step one);
3) identifying and executing short term and long term swaps (AKA swap streams) of risk between different client companies with an optional step for client approval before execution;
4) optionally displaying risks that can not be swapped with existing clients for sale or swap over the Internet;
5) analyzing existing liabilities and the remaining risks for all client companies in order to determine price levels for insurance coverage by category, assess reserve status and identify the need (if any) for contingent capital such as reinsurance under a variety of scenarios; and
6) optionally providing insurance coverage for client companies at the specified prices after client approval.

Because information on the liquidity position and foreign exchange needs of each client company is obtained along with the risk information, the system of the present invention is also capable of functioning as an automated, on-line capital transfer system, alone or in combination with the risk transfer supply chain system.

Swaps are generally completed only for client company risks having variability associated with external factors, however swaps for element variability and event risks can also be completed. The swaps completed in the third step of processing outlined above can include a number of different types of transactions including:

1. fixed quantity swaps of external factor risks at specified times that are traditionally hedged such as interest rate, currency, commodity and weather swaps;
2. fixed quantity swaps of external factor risks at specified times that are not traditionally hedged such as airline mile, personal computer shipment and China GDP related risks; and
3. long-term swaps of a fixed percentage of a given risk, for example a client company could choose to swap 20% of its exposure to oil price risk for a given time period.

The long term swaps of fixed percentages of risk described above will hereinafter be referred to as swap streams. Swap streams are uniquely enabled by system of the present invention as the system can use the steady stream of information it receives from client companies to update the terms of the swap stream transaction to account for changes in forecast.

In any event, the operator would use the risk transfer supply chain system to identify groups of client companies that had offsetting risks to the same index in order to complete a swap transaction (fixed quantity or swap stream). For example, airlines would be negatively affected by a decrease in airline miles while bus and train service providers would be positively affected by this same decrease. As detailed later, completing the transaction requires the development of an airline mile index, an agreement between two parties as to what index levels will trigger payments for what time periods (fixed time periods or a stream of monthly payments) and a price that will be paid when the index movement triggers payment. The risk transfer supply chain system uses the information on risk-profiles provided by the client companies to identify the most natural client company matches to offset each risk for each client company. If the client company has authorized the operator to make swap transactions, then the swaps will be made by the system of the present invention as they are identified and the client companies will be notified of the change. If the client company has not authorized the operator to make swap transactions, then the client company will be notified of the proposed swap transaction and the system will execute the transaction only after receiving client approval.

If there are any risks that could potentially be swapped that don't have natural offsets from other client companies, then the system of the present invention can make these risks available to other companies that are not the clients of the risk supply chain system operator by posting information concerning these risks on the supply chain web site. Other companies can either swap their risk positions with the client company or they can purchase the risk. In doing this, the risk supply chain system creates a market for a number of new types of risk transfer agreements that will give corporations an even greater ability to shape their risk profiles. The economics of the automated system are such that only one other company may need to be found for each risk identified for transfer in order for the system to be effective. In any event, the risk supply chain system allows client companies to use swaps to transfer a relatively large portion of their risk at a cost that is far lower than that provided by traditional insurance products.

After the fixed quantity swaps and swap stream transactions are completed, the system of the present invention goes on to analyze the remaining risks for all client companies as required to project financial performance, assess the adequacy of its reserves and set prices for new and existing insurance products. As part of this analysis, the risk supply chain system is uniquely capable of defining and offering a new kind of insurance coverage that covers the full portfolio of risk for each client company (before or after the swap transactions take place). The portfolio of risk is all the risks, external factor variability, element variability and event risk, faced by a client company.

The benefits of risk portfolio insurance derive from the fact that when risks are analyzed in combination there are natural offsets because they are not perfectly correlated. For example, if a client had three risks that were not perfectly correlated and each risk had a 50% probability of causing $100 loss, then the company with these risks would have less than a 50% probability of suffering a $300 loss from these 3 risks as illustrated in FIG. 8. This new kind of insurance has the potential to give client companies what they really want, protection from large losses—no matter what the cause of the loss is.

In addition to enabling the just in time provision of financial services, the present invention has the added benefit of eliminating a great deal of time-consuming and expensive effort by automating the extraction of data from the databases, tables, and files from customer financial systems, the web-site transaction log, external databases and the Internet. In accordance with the invention, the automated extraction, aggregation and analysis of data from a variety of existing computer-based systems significantly increases the scale, scope and timeliness of the analysis that can be completed in a cost-effective manner.

By eliminating the barriers to financial service automation identified previously, the system of the present invention enables the just-in-time provision of risk transfer products and services that are tailored to the exact needs of the client company. The electronic linkage also eliminates the time lag that prevents many companies from obtaining the risk reduction products they need in a timely fashion.

BRIEF DESCRIPTION OF DRAWINGS

These and other objects, features and advantages of the present invention will be more readily apparent from the following description of one embodiment of the invention in which:

FIG. 5A, FIG. 5B and FIG. 5C are block diagrams showing the sequence of steps in the present invention used for specifying system settings and for initializing and operating the data bots that extract, aggregate, store and manipulate information utilized in system processing from: user input, the web site transaction log database (12), the external database (25), the Client Value and Risk™ System database and the Internet (40);

FIG. 6A and FIG. 6B are block diagrams showing the sequence of steps in the present invention used for developing the optimal risk reduction strategy for each client company;

DETAILED DESCRIPTION OF ONE EMBODIMENT

Figure 1:
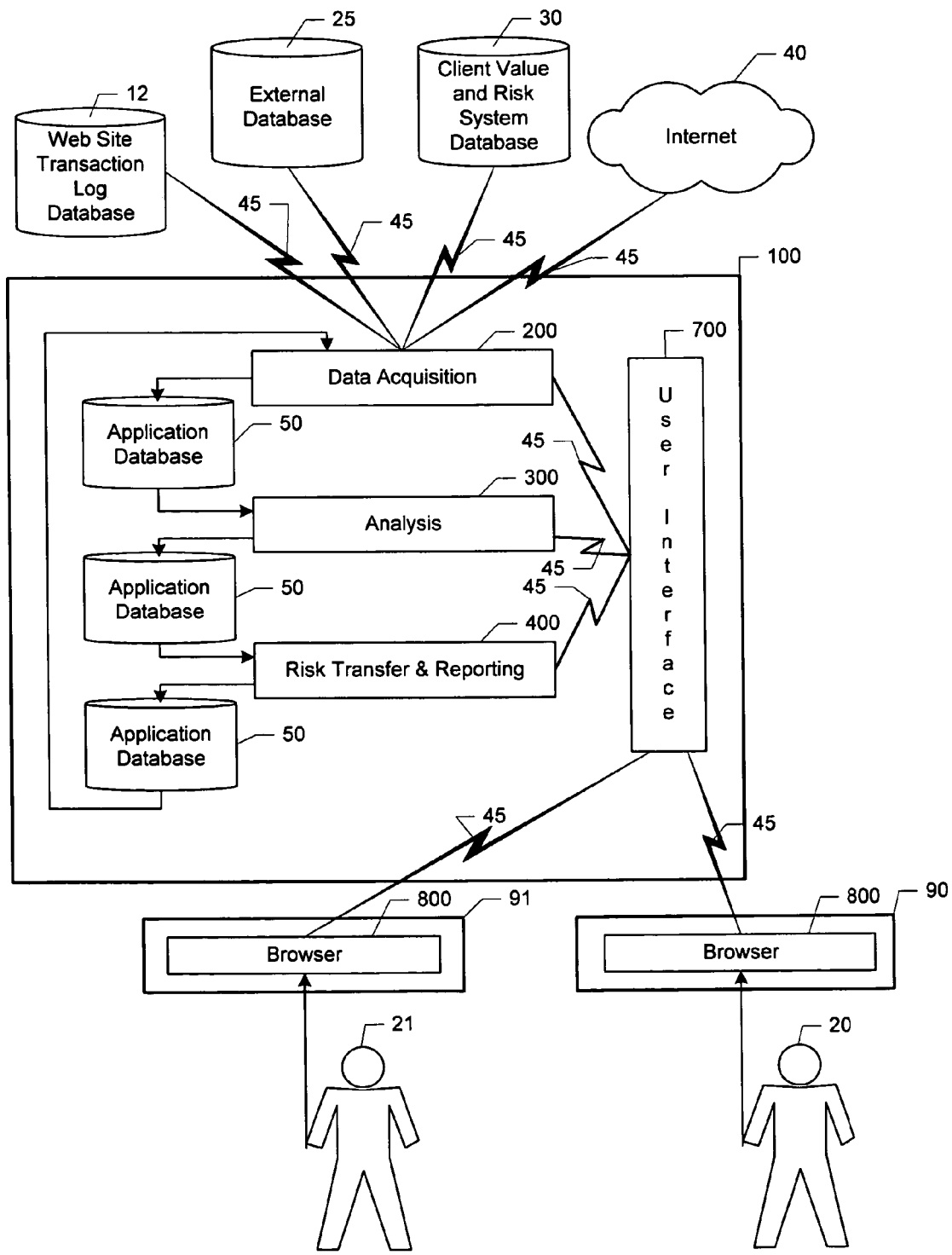
FIG. 1 is a block diagram showing the major processing steps of the present invention.

FIG. 1 provides an overview of the processing completed by the risk transfer supply chain system. In accordance with the present invention, a method of and system (100) for automated risk transfer is provided. Processing starts in this system (100) with the specification of system settings and the initialization and activation of software data "bots" (200) that extract, aggregate, manipulate and store the data and user (20) input used in system processing. This information is extracted via a network (45) from: a web site transaction log database (12), an external database (25), a Client Value and Risk™ System database (30) and the Internet (40). These information extractions and aggregations may be influenced by a user (20) through interaction with a user-interface portion of the application software (700) that mediates the display, transmission and receipt of all information to and from browser software (800) such as the Microsoft Internet Explorer or Netscape Navigator in an access device (90) such as a phone or personal computer that the user (20) interacts with. The client (21) also interacts with the system of the present invention through interaction with a user-interface portion of the application software (700) that mediates the display, transmission and receipt of all information to and from browser software (800) such as the Microsoft Internet Explorer or Netscape Navigator in an access device (91) such as a phone or personal computer that the client (21) controls. While only one database of each type (12, 25 and 30) is shown in FIG. 1, it is to be understood that the system (100) can extract data from multiple databases of each type via the network (45). It should be understood that it is possible to use peer-to-peer networking to complete the data transfer. It is also possible to complete a bulk extraction of data from each database (12, 25, and 30) via the network (45) using data extraction applications before initializing the data bots. The data extracted in bulk could be stored in a single datamart or data warehouse where the data bots could operate on the aggregated data.

Figure 2:
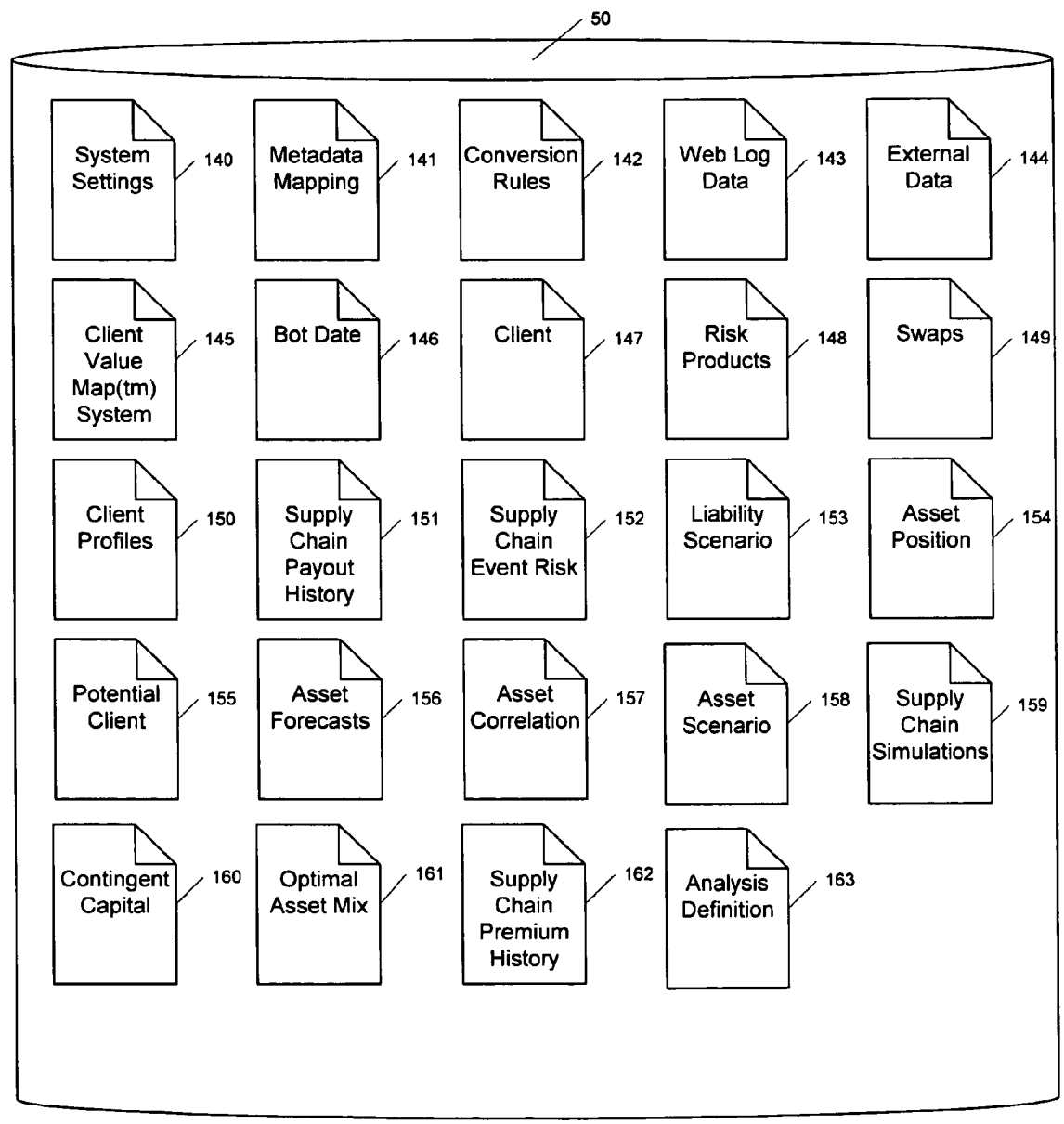
FIG. 2 is a diagram showing the files or tables in the application database (50) of the present invention that are utilized for data storage and retrieval during the processing in the novel risk transfer supply chain system.

All extracted information is stored in a file or table (hereinafter, table) within an application database (50) as shown in FIG. 2. The application database (50) contains tables for storing user input, extracted information and system calculations including a system settings table (140), a metadata mapping table (141), a conversion rules table (142), a web log table (143), an external data table (114), a Client Value and Risk™ System table (145), a bot date table (146), a client table (147), a risk products table (148), a swaps table (149), a client profile table (150), a supply chain payout history table (151), a supply chain risk table (152), a liability scenario table (153), an asset position table (154), a potential client table (155), an asset forecasts table (156), an asset correlation table (157), an asset scenario table (158), a supply chain simulations table (159), a contingent capital table (160), an optimal asset mix table (161), a supply chain premium history table (162) and an analysis definition table (163). The application database (50) can optionally exist as a datamart, data warehouse or departmental warehouse. The system of the present invention has the ability to accept and store supplemental or primary data directly from user input, a data warehouse or other electronic files in addition to receiving data from the databases described previously. The system of the present invention also has the ability to complete the necessary calculations without receiving data from one or more of the specified databases. However, in one embodiment all information is obtained from the specified data sources (12, 25, 30 and 40).

Figure 3:
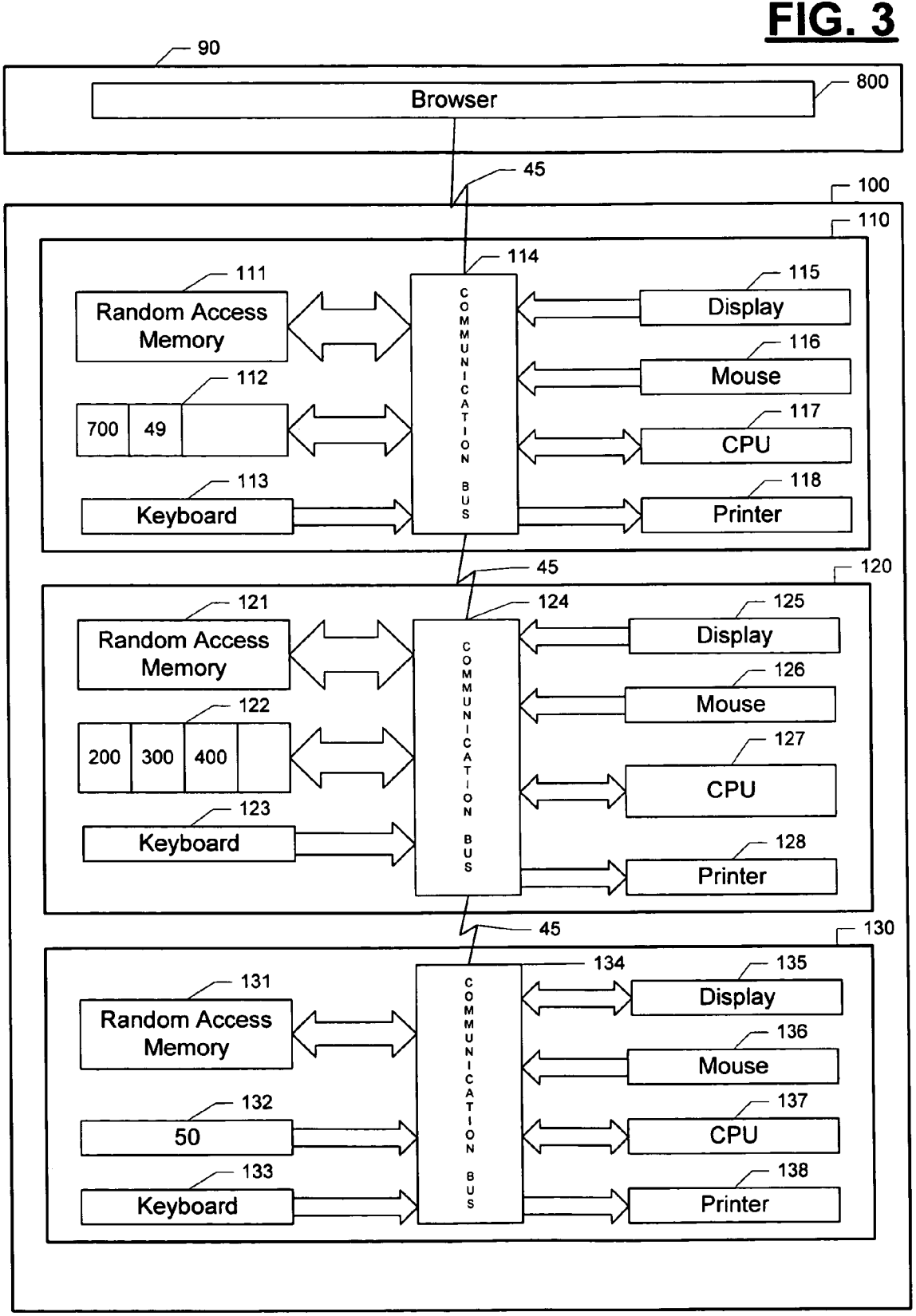
FIG. 3 is a block diagram of an implementation of the present invention.
Figure 4:
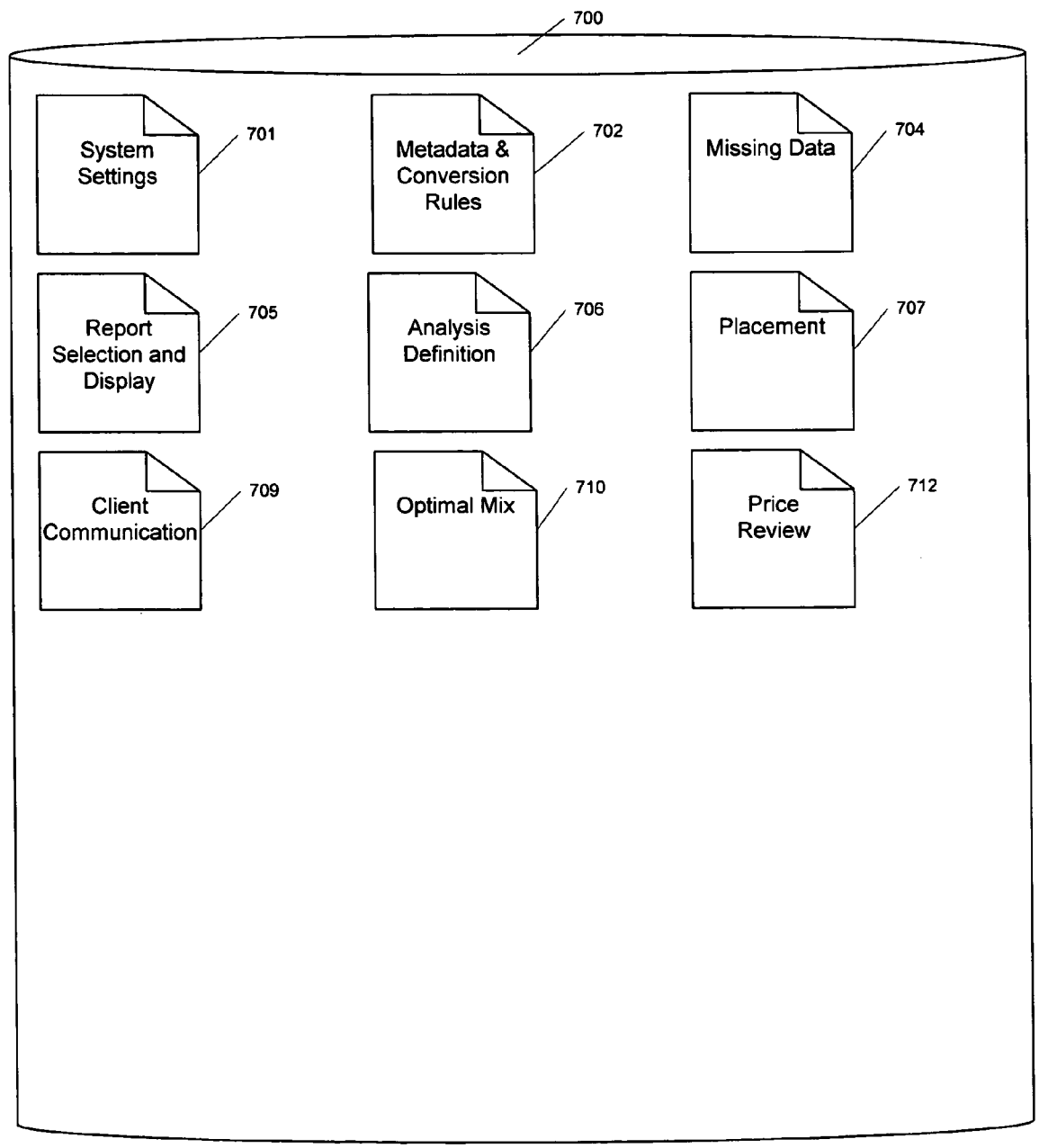
FIG. 4 is a diagram showing the data windows that are used for receiving information from and transmitting information to the user (20) and the client (21) during system processing.

As shown in FIG. 3, one embodiment of the present invention is a computer system (100) illustratively comprised of a user-interface personal computer (110) connected to an application-server personal computer (120) via a network (45). The application server personal computer (120) is in turn connected via the network (45) to a database-server personal computer (130). The user interface personal computer (110) is also connected via the network (45) to a Internet browser appliances (90 & 91) that contains browser software (800) such as Microsoft Internet Explorer or Netscape Navigator.

The database-server personal computer (130) has a read/write random access memory (131), a hard drive (132) for storage of the application database (50), a keyboard (133), a communications bus (134), a display (135), a mouse (136), a CPU (137) and a printer (138).

The application-server personal computer (120) has a read/write random access memory (121), a hard drive (122) for storage of the non-user-interface portion of the application software (200, 300 and 400) of the present invention, a keyboard (123), a communications bus (124), a display (125), a mouse (126), a CPU (127) and a printer (128). While only one client personal computer is shown in FIG. 3, it is to be understood that the application-server personal computer (120) can be networked to fifty or more client personal computers (110) via the network (45). The application-server personal computer (120) can also be networked to fifty or more server, personal computers (130) via the network (45). It is to be understood that the diagram of FIG. 3 is merely illustrative of one embodiment of the present invention.

The user-interface personal computer (110) has a read/write random access memory (111), a hard drive (112) for storage of a client data-base (49) and the user-interface portion of the application software (700), a keyboard (113), a communications bus (114), a display (115), a mouse (116), a CPU (117) and a printer (118).

The application software (200, 300, 400 and 700) controls the performance of the central processing unit (127) as it completes the calculations required to support the risk transfer supply chain system. In the embodiment illustrated herein, the application software program (200, 300, 400 and 700) is written in a combination of C++ and Visual Basic®. The application software (200, 300, 400 and 700) can use Structured Query Language (SQL) for extracting data from the databases and the Internet (12, 25, 30 and 40). The user (20) can optionally interact with the user-interface portion of the application software (700) using the browser software (800) in the browser appliance (90) to provide information to the application software (200, 300, 400 and 700) for use in determining which data will be extracted and transferred to the application database (50) by the data bots.

User input is initially saved to the client database (49) before being transmitted to the communication bus (124) and on to the hard drive (122) of the application-server computer via the network (45). Following the program instructions of the application software, the central processing unit (127) accesses the extracted data and user input by retrieving it from the hard drive (122) using the random access memory (121) as computation workspace in a manner that is well known.

The computers (110, 120 and 130) shown in FIG. 3 illustratively are personal computers or any of the more powerful computers or workstations that are widely available. Typical memory configurations for client personal computers (110) used with the present invention should include at least 512 megabytes of semiconductor random access memory (111) and at least a 100 gigabyte hard drive (112). Typical memory configurations for the application-server personal computer (120) used with the present invention should include at least 2056 megabytes of semiconductor random access memory (121) and at least a 250 gigabyte hard drive (122). Typical memory configurations for the database-server personal computer (130) used with the present invention should include at least 5112 megabytes of semiconductor random access memory (131) and at least a 500 gigabyte hard drive (132).

Figure 5A:
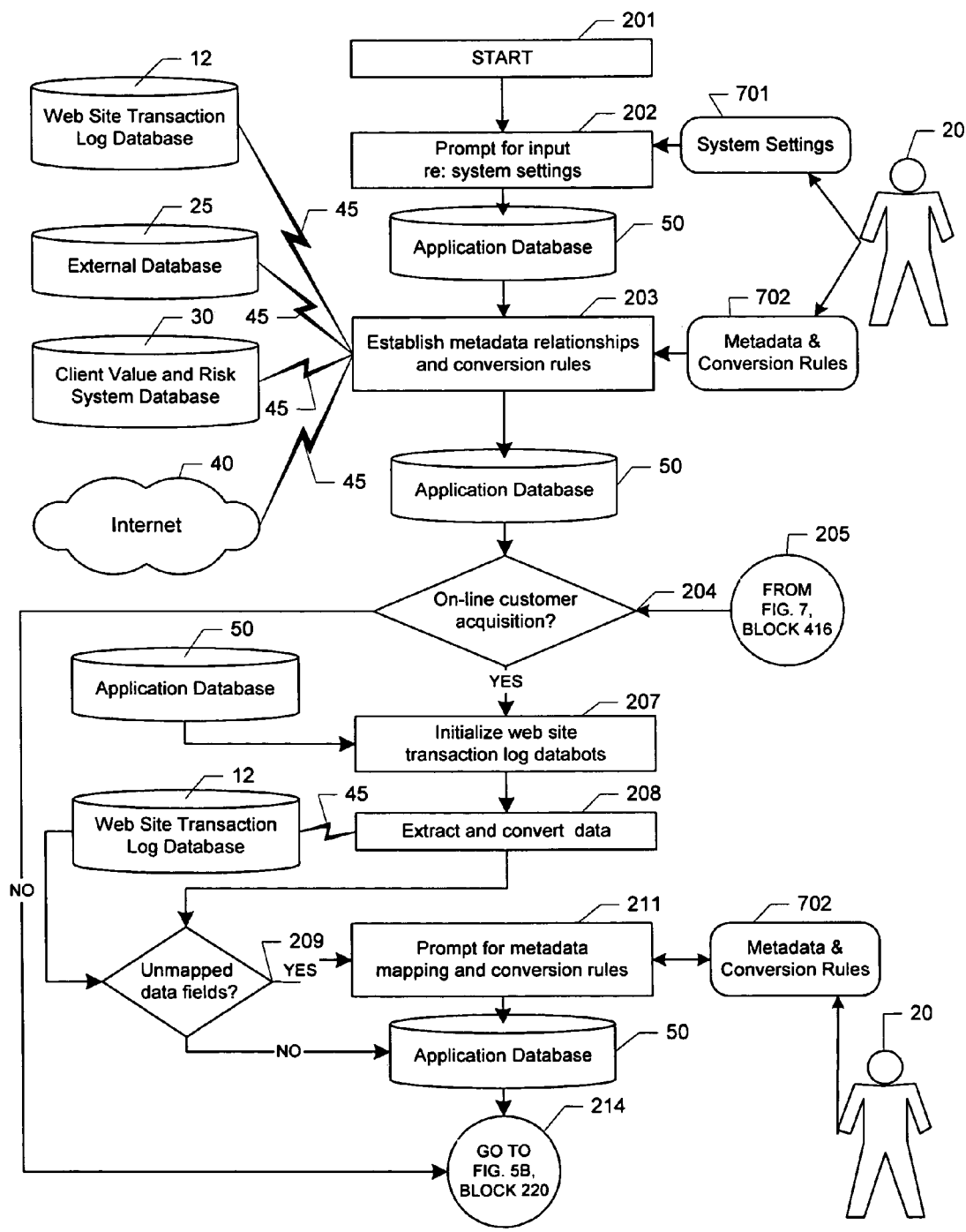
Figure 5B:
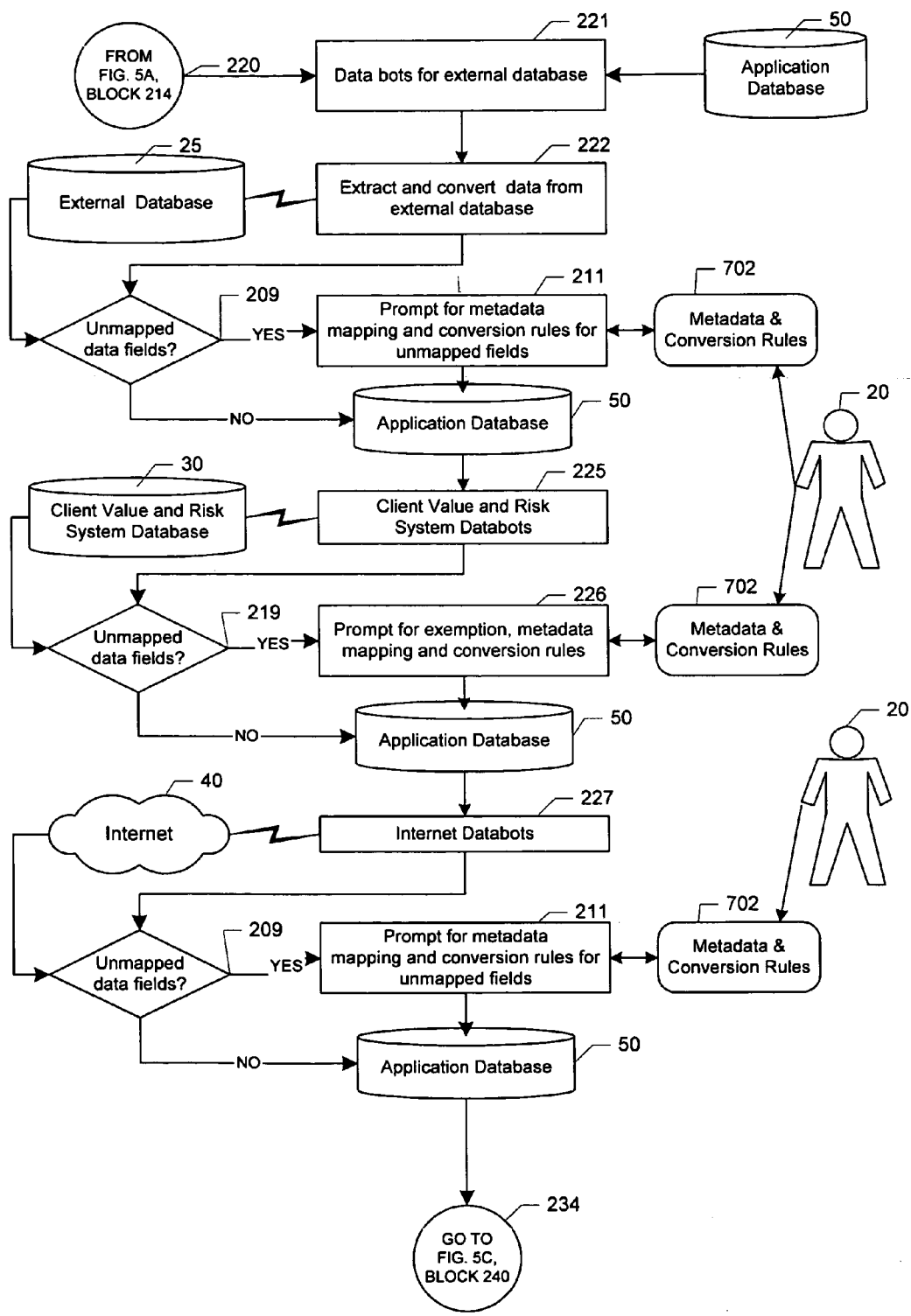
Figure 6B:
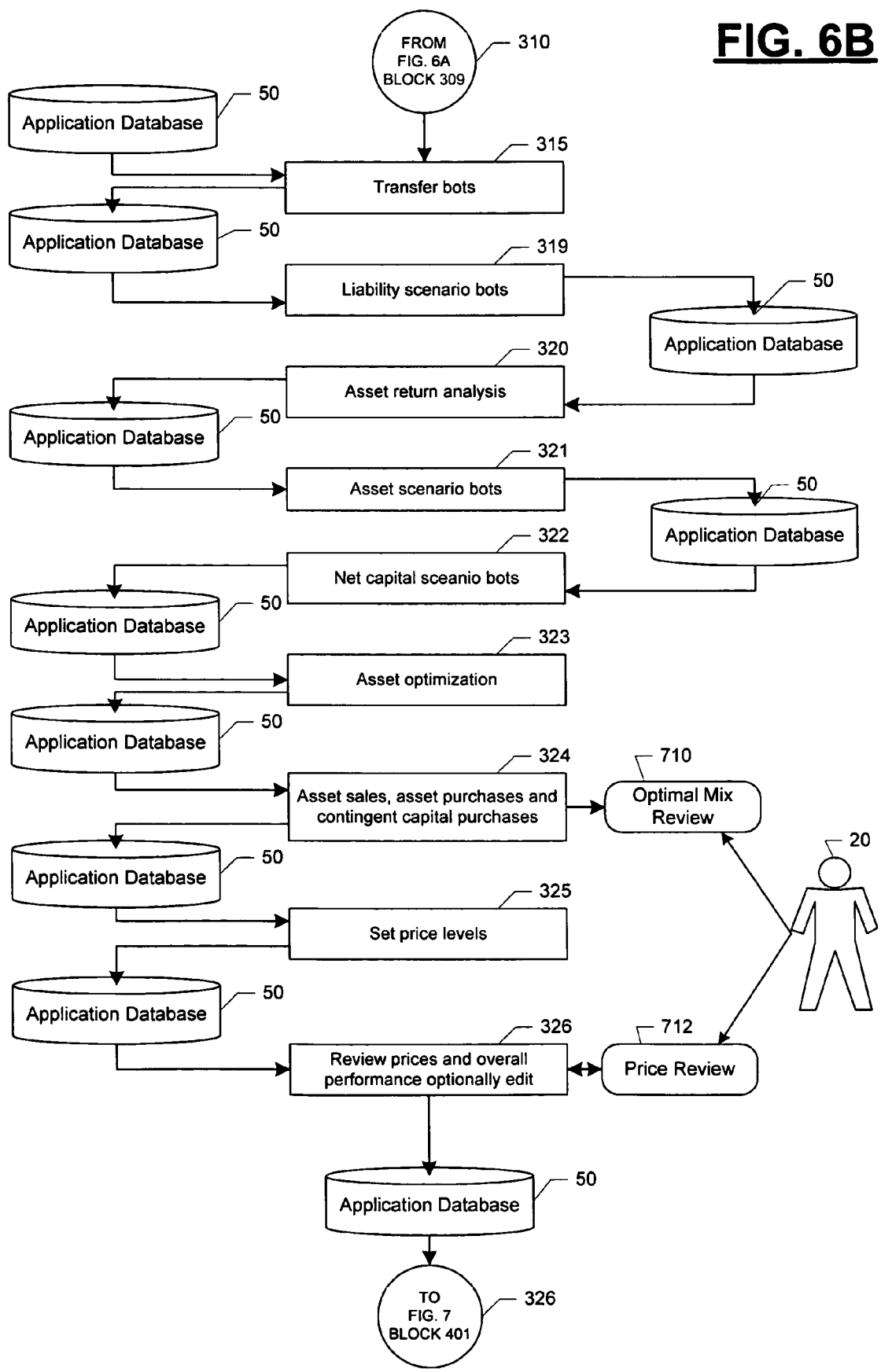

Using the system described above, a comprehensive risk management program is developed and implemented for each enterprise or multi-enterprise organization that is a client of the company operating the on-line risk transfer supply chain system (hereinafter, the operator). The risk reduction program implementation is completed in three distinct stages. As shown in FIG. 5A, FIG. 5B and FIG. 5C the first stage of processing (block 200 from FIG. 1) programs bots to continually extract, aggregate, manipulate and store the data from client company databases, other databases and the Internet (12, 25, 30 and 40) as required for operation of the on-line risk transfer supply chain system. As shown in FIG. 6A and FIG. 6B the second stage of processing (block 300 from FIG. 1) programs analysis bots that optionally analyze the risks faced by each client company under normal and extreme conditions as required to develop a comprehensive risk management program. The bots in this stage also analyze the risks from all client companies as required to identify swaps, set prices, evaluate reserves and purchase re-insurance as required. The third and final stage of processing (block 300 from FIG. 1) manages operator communications with each client company as required to complete risk reduction program transactions, completes user-defined analyses and optionally prints reports for use by the operator.

System Settings and Data Bots

The flow diagrams in FIG. 5A and FIG. 5B detail the processing that is completed by the portion of the application software (200) that extracts, aggregates, transforms and stores the information used for system operation from the: user input, the web site transaction log database (12), external database (25), Client Value and Risk™ System database (30) and the Internet (40). A brief overview of the different databases will be presented before reviewing each step of processing completed by this portion (200) of the application software.

Web site transaction log databases keep a detailed record of every visit to a web site, they can be used to trace the path of each visitor during his or her visit to the web site and upon further analysis can be used to identify patterns that are most likely to result in purchases and those that are most likely to result in abandonment. This information can also be used to identify which promotions would generate the highest response rate from potential clients. Web site transaction logs generally contain the information shown in Table 2.

TABLE 2

Web Site Transaction Log Database

1. Customer's URL
2. Date and time of visit
3. Pages visited
4. Length of page visit (time)
5. Type of browser used TABLE 2-continued Web Site Transaction Log Database 6. Referring site
7. URL of site visited next
8. Downloaded file volume and type
9. Cookies
10. Transactions Information from external databases is used to supplement information obtained from the web site transaction log database (12) and the Client Value and Risk™ System (30). Information from external database (25) enables the evaluation of a variety of things including event risks, external factors and prices for exchange traded options and derivatives. In the system of the present invention, the information extracted from external databases (25) can be in the forms listed in Table 3.

TABLE 3

Types of information 1) numeric information such as the market price information for derivatives and equities found in the various summaries of activity in the New York, Chicago, London, Tokyo and other exchanges
2) text information such as that found in the Lexis Nexis database and databases containing past issues from specific publications,
3) event risk data including information about the likelihood of earthquake and weather damage by geospatial location The system of the present invention uses different "bot" types to process each distinct data type from each external database (25). The same "tot types" are also used for extracting each of the different types of data from the internet (40). The system of the present invention uses the Internet (40) as an alternate source for the same information described in Table 3.

Client Value and Risk™ System databases contain the: matrix of value, matrix of risk, liquidity, statistics and efficient frontier information for a variety of scenarios as detailed in cross-referenced application 09/994,740 filed Nov. 28, 2001 and cross-referenced application number 09/953,148 filed Sep. 17, 2001 the disclosure of which is incorporated herein by reference.

While the system of the present invention processes data from an unlimited number of clients, the operation of the system will be illustrated by a detailed explanation of the processing related to one client company.

System processing of the information from the different databases (12, 25 and 30) and the Internet (40) described above starts in a block 201, FIG. 5A, which immediately passes processing to a software block 202. The software in block 202 prompts the user (20) via the system settings data window (701) to provide system setting information. The system setting information entered by the user (20) is transmitted via the network (45) back to the application server (120) where it is stored in the system settings table (140) in the application database (50) in a manner that is well known. The specific inputs the user (20) is asked to provide at this point in processing are shown in Table 4.

TABLE 4

1. New run or structure revision?
2. Continuous, If yes, frequency? (hourly, daily, weekly, monthly or quarterly)
3. Metadata standard TABLE 4-continued 4. Location of external databases and metadata
5. Location of web site transaction log database and metadata
6. Location of Client Value and Risk System database and metadata
7. Base currency
8. Location of database and metadata for equity information
9. Location of database and metadata for debt information
10. Location of database and metadata for tax rate information
11. Location of database and metadata for currency conversion rate information
12. The maximum number of generations to be processed without improving fitness
13. Total cost of capital (weighted average cost of equity, debt and risk capital)
14. Management report types (text, graphic, both)
15. Default reports
16. Default Missing Data Procedure
17. Maximum time to wait for user input
18. On-line customer acquisition (Yes or No)
19. Time periods requiring data (optional)
20. Target return on capital (percentage)

The software in block 202 uses the current system date to determine the time periods (months) that require data to provide the automated risk transfer service. After the date range is calculated, it is stored in the system settings table (140). In one embodiment the system obtains the complete matrix of value, complete matrix of risk and all related statistics for the four year period before and the three year forecast period after the current date. The user (20) also has the option of specifying the data periods that will be used for completing system calculations. The client (21) has the option of providing more or less data than called for in one embodiment. However, if less data is provided, then the system will only be able to transfer risk for risks for those segments where matrix of risk information was provided.

After the storage of system setting data is complete, processing advances to a software block 203. The software in block 203 prompts the user (20) via the metadata and conversion rules window (702) to map metadata using the standard specified by the user (20) from the web site transaction log database (12), the external database (25) and the Client Value and Risk™ System database (30) to the pre-specified fields in the metadata mapping table (141). Pre-specified fields in the metadata mapping table include: each cell in the standard matrix of value configuration, each cell in the standard matrix of risk configuration, the preferred risk management strategy by risk matrix cell and the standard set of statistics for each matrix as described in cross-referenced application Ser. No. 09/994,740 filed Nov. 28, 2001 and cross-referenced application Ser. No. 09/953,148 filed Sep. 17, 2001.

As part of the metadata mapping process, any database fields that are not mapped to pre-specified fields are defined by the user (20) as belonging to: one of the pre-defined fields, the external data table (144), the potential client table (155) or non-relevant attributes and "mapped" in the metadata mapping table (141) to the corresponding fields in each database in a manner identical to that described above for the pre-specified fields. After all fields have been mapped to the metadata mapping table (141), the software in block 203 prompts the user (20) via the metadata and conversion rules window (702) to provide conversion rules for each metadata field for each data source. Conversion rules will include information regarding currency conversions and conversion for units of measure that may be required to accurately and consistently analyze the data. The inputs from the user (20) regarding conversion rules are stored in the conversion rules table (142) in the application database (50). When conversion rules have been stored for all fields from every data source, then processing advances to a software block 204.

The software in block 204 checks the system settings table (140) in the application database (50) to determine if the on-line customer acquisition is being used. If on-line customer acquisition is not being used, then processing advances to a software block 221. Alternatively, if on-line customer acquisition is being used, then processing advances to a block 207.

The software in block 207 checks the bot date table (146) and deactivates any web site transaction log data bots with creation dates before the current system date and retrieves information from the system settings table (140), metadata mapping table (141) and conversion rules table (142). The software in block 207 then initializes data bots for each field in the metadata mapping table (141) that mapped to the web site transaction log database (12) in accordance with the frequency specified by user (20) in the system settings table (140). Bots are independent components of the application that have specific tasks to perform. In the case of web-site transaction log data bots, their primary task is to extract and store web-site transaction log data. Each data bot initialized by software block 207 will store its data in the web log data table (143). Every web-site transaction log data bot contains the information shown in Table 5.

TABLE 5

1. Unique ID number (based on date, hour, minute, second of creation)
2. The data source location
3. Mapping information
4. Timing of extraction
5. Conversion rules (if any)
6. Storage Location (to allow for tracking of source and destination events)
7. Creation date (date, hour, minute, second)

After the software in block 207 initializes all the bots for the web site transaction log database, processing advances to a software block 208. The software in block 208 activates the bots, the bots then extract and convert data in accordance with their preprogrammed instructions in accordance with the frequency specified by user (20) in the system settings table (140). As each bot extracts and converts data from the web site transaction log database (12), processing advances to a software block 209 before the bot completes data storage. The software in block 209 checks the web site transaction log metadata to see if all fields have been extracted. If the software in block 209 finds no unmapped data fields, then the extracted, converted data are stored in the web log data table (143). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the web log data table (143). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to a software block 221.

The software in block 221 checks the bot date table (146) and deactivates any external database data bots with creation dates before the current system date and retrieves information from the system settings table (140), metadata mapping table (141) and conversion rules table (142). The software in block 221 then initializes data bots for each field in the metadata mapping table (141) that mapped to the external database (25) in accordance with the frequency specified by user (20) in the system settings table (140). Bots are independent components of the application that have specific tasks to perform. In the case of external database data bots, their primary task is to extract and store data from an external database. Each data bot initialized by software block 221 will store its data in the external data table (144). Every external database data bot contains the information shown in Table 6.

TABLE 6

1. Unique ID number (based on date, hour, minute, second of creation)
2. The data source location
3. Mapping information
4. Timing of extraction
5. Conversion rules (if any)
6. Storage Location (to allow for tracking of source and destination events)
7. Creation date (date, hour, minute, second)

After the software in block 221 initializes all the bots for the external database, processing advances to a block 222. In block 222, the bots extract and convert data in accordance with their preprogrammed instructions. As each bot extracts and converts data from the external database (25), processing advances to a software block 209 before the bot completes data storage. The software in block 209 checks the external database metadata to see if all fields have been extracted. If the software in block 209 finds no unmapped data fields, then the extracted, converted data are stored in the external data table (144). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the external data table (144). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to a software block 225.

The software in block 225 checks the bot date table (146) and deactivates any Client Value and Risk™ System data bots with creation dates before the current system date and retrieves information from the system settings table (140), metadata mapping table (141), conversion rules table (142) and client table (147). The software in block 225 then initializes data bots for each field in the metadata mapping table (141) that mapped to the Client Value and Risk™ System database (30) in accordance with the frequency specified by user (20) in the system settings table (140). Bots are independent components of the application that have specific tasks to perform. In the case of Client Value and Risk™ System data bots, their primary task is to extract and store Client Value and Risk™ System data. Each data bot initialized by software block 225 will store its data in the Client Value and Risk™ System table (145). Every Client Value and Risk™ System data bot contains the information shown in Table 7.

TABLE 7

1. Unique ID number (based on date, hour, minute, second of creation)
2. The data source location
3. Mapping information
4. Timing of extraction
5. Client
6. Conversion rules (if any)
6. Storage Location (to allow for tracking of source and destination events)
7. Creation date (date, hour, minute, second)

After the software in block 225 initializes all the bots for the Client Value and Risk™ System database, the bots extract and convert data in accordance with their preprogrammed instructions in accordance with the frequency specified by user (20) in the system settings table (140). As each bot extracts and converts data from the Client Value and Risk™ System database (30), processing advances to a software block 219 before the bot completes data storage. The software in block 219 checks the Client Value and Risk™ System database metadata and the metadata mapping table (141) to see if all fields have been extracted. If the software in block 219 finds no unmapped data fields, then the extracted, converted data are stored in the Client Value and Risk™ System table (145). Alternatively, if there are fields that have not been extracted or specified fields where data was not made available by the client, then processing advances to a block 226. The software in block 226 prompts the user (20) via the metadata and conversion rules window (702) to provide metadata and conversion rules for each new field and/or to exempt this client from providing some of the specified data. The information regarding any new metadata and conversion rules is stored in the metadata mapping table (141) and conversion rules table (142) while the extracted, converted data are stored in the Client Value and Risk™ System table (145). The information regarding client exemptions from providing requested data is stored in the clients table (147). It is worth noting at this point that the activation and operation of bots where all the fields have been mapped to the application database (50) continues. Only bots with unmapped fields or missing data "wait" for user input before completing data storage. The new metadata, conversion rule and client information will be used the next time bots are initialized in accordance with the frequency established by the user (20). In either event, system processing then passes on to software block 227.

The software in block 227 checks the bot date table (146) and deactivates any Internet data bots with creation dates before the current system date and retrieves information from the system settings table (140), metadata mapping table (141) and conversion rules table (142). The software in block 227 then initializes data bots for each field in the metadata mapping table (141) that mapped to the Internet (40) in accordance with the frequency specified by user (20) in the system settings table (140). Bots are independent components of the application that have specific tasks to perform. In the case of Internet data bots, their primary task is to extract and store data from the Internet. Each data bot initialized by software block 227 will store its data in the external data table (144). Every Internet data bot contains the information shown in Table 8.

TABLE 8

1. Unique ID number (based on date, hour, minute, second of creation)
2. The data source location
3. Mapping information
4. Timing of extraction
5. Conversion rules (if any)
6. Storage Location (to allow for tracking of source and destination events)
7. Creation date (date, hour, minute, second)

After the software in block 227 initializes all the Internet data bots, the bots extract and convert data in accordance with their preprogrammed instructions. As each bot extracts and converts data from the Internet (40), processing advances to a software block 209 before the bot completes data storage. The software in block 209 checks the external database metadata to see if all fields have been extracted. If the software in block 209 finds no unmapped data fields, then the extracted, converted data are stored in the external data table (144). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the external data table (144). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to a software block 241.

The software in block 241 checks: the metadata mapping table (141), the web log data table (143), the external data table (144) and the Client Value and Risk™ System table (145) to see if data are missing from any of the periods required for system calculation. The range of required dates was previously calculated by the software in block 202. If there are no data missing from any period, then processing advances to a software block 302. Alternatively, if there are missing data for any field for any period, then processing advances to a block 242.

The software in block 242, prompts the user (20) via the missing data window (704) to specify the method to be used for filling the blanks for each item that is missing data. Options the user (20) can choose from for filling the blanks include: the average value for the item over the entire time period, the average value for the item over a specified period, zero, the average of the preceding item and the following item values and direct user input for each missing item. If the user (20) does not provide input within a specified interval, then the default missing data procedure specified in the system settings table (140) is used. When all the blanks have been filled and stored for all of the missing data, system processing advances to a block 302.

Analysis

The flow diagram in FIGS. 6A and 6B details the processing that is completed by the portion of the application software (300) that analyzes information from all client companies and arranges for risk "swaps", swap streams and/or the sale of risk reduction products to each client company at a price that meets the profit goals and reserve requirements of the operator. This portion of the application software also optionally analyzes and develops a risk reduction strategy for client companies.

System processing in this portion of the application software (300) begins in a block 302. The software in block 302 checks the client table (147) in the application database (50) to determine if a risk reduction strategy needs to be developed for the client being analyzed. If the client has already identified a risk reduction strategy, then processing advances to a software block 315. Alternatively, if the calculation is new or a structure change, then processing advances to a software block 303.

The software in block 303 checks the bot date table (146) and deactivates any risk reduction activity bots with creation dates before the current system date. The software in block 303 then retrieves the information from the system settings table (140), the external data table (144) and the Client Value and Risk™ System table (145) as required to initialize risk reduction activity bots for each causal value driver, external factor, factor combination element combination and event risk identified in the matrix of risk for the client company.

Bots are independent components of the application that have specific tasks to perform. In the case of risk reduction activity bots, their primary tasks are to identify actions that can be taken by the client company to reduce risk under both normal and extreme risk scenarios. For example, if one customer presents a significant risk to the client, then the risk reduction bot might identify a reduction in the credit line for that customer to reduce the risk. Every risk reduction activity bot contains the information shown in Table 9.

TABLE 9

1. Unique ID number (based on date, hour, minute, second of creation)
2. Creation date (date, hour, minute, second)
3. Mapping information
4. Storage location
5. Client ID
6. Value driver, external factor, factor combination, element combination or event risk When bots in block 303 have identified and stored risk reduction activities in the client profiles table (150) by scenario, processing advances to a software block 304.

The software in block 304 checks the bot date table (146) and deactivates any forecast bots with creation dates before the current system date. The software in block 304 then retrieves the information from the system settings table (140), the client table (147), the external data table (144) and the Client Value and Risk™ System table (145) as required to initialize forecast bots in accordance with the frequency specified by the user (20) in the system settings table (140).

Bots are independent components of the application that have specific tasks to perform. In the case of forecast bots, their primary task is to compare the forecasts stored for external factors and financial asset values with the information available from futures exchanges. Every forecast bot activated in this block contains the information shown in Table 10.

TABLE 10

1. Unique ID number (based on date, hour, minute, second of creation)
2. Creation date (date, hour, minute, second)
3. Mapping information
4. Storage location TABLE 10-continued 5. Client
6. External factor or financial asset
7. Forecast time period After the forecast bots are initialized, they activate in accordance with the frequency specified by the user (20) in the system settings table (140). Once activated, they retrieve the required information and determine if any forecasts need to be changed to bring them in line with the market data on future values. The bot saves the updated forecasts in the Client Value and Risk™ System table (145) in the application database (50) before processing advances to a block 305.

The software in block 305 checks the bot date table (146) and deactivates any scenario bots with creation dates before the current system date. The software in block 305 then retrieves the information from the system settings table (140), the external data table (144), the Client Value and Risk™ System table (145), the client table (147) and the client profile table (150) as required to initialize scenario bots in accordance with the frequency specified by the user (20) in the system settings table (140).

Bots are independent components of the application that have specific tasks to perform. In the case of scenario bots, their primary task is to identify likely scenarios for the evolution of the causal value drivers, element combinations, factor combinations, external factors and event risks. The scenario bots use the information from the Client Value and Risk™ System (30) and external databases (25) to obtain forecasts for individual causal factors as well as covariance information for the other causal value drivers, external factors, element combinations, factor combinations and event risks under normal conditions. They also use the extreme value information to calculate extreme scenarios. Every scenario bot activated in this block contains the information shown in Table 11.

TABLE 11

1. Unique ID number (based on date, hour, minute, second of creation)
2. Creation date (date, hour, minute, second)
3. Mapping information
4. Storage location
5. Type: Normal or Extreme
6. Client company After the scenario bots are initialized, they activate in accordance with the frequency specified by the user (20) in the system settings table (140). Once activated, they retrieve the required information and develop a variety of scenarios as described previously. After the scenario bots complete their calculations they save the resulting scenarios in the client profiles table (150) in the application database (50) and processing advances to a block 306.

The software in block 306 checks the bot date table (146) and deactivates any simulation bots with creation dates before the current system date. The software in block 306 then retrieves the information from the system settings table (140), the external data table (144), the Client Value and Risk™ System table (145), the client table (147) and the client profile table (150) as required to initialize simulation bots in accordance with the frequency specified by the user (20) in the system settings table (140).

Bots are independent components of the application that have specific tasks to perform. In the case of simulation bots, their primary task is to run three different types of simulations for the client company. The simulation bots run simulations of client financial performance and valuation using: the two types of scenarios generated by the scenario bots—normal and extreme, they also run an unconstrained genetic algorithm simulation that evolves to the most negative scenario. In addition to examining the economic factors that were identified in the previous analysis, the bots simulate the impact of event risks like fire, earthquakes, floods and other weather-related risks that are generally un-correlated with the economic scenarios. Every simulation bot activated in this block contains the information shown in Table 12.

TABLE 12

1. Unique ID number (based on date, hour, minute, second of creation)
2. Creation date (date, hour, minute, second)
3. Mapping information
4. Storage location
5. Type: Normal, Extreme or Genetic Algorithm
6. Client After the simulation bots are initialized, they activate in accordance with the frequency specified by the user (20) in the system settings table (140). Once activated, they retrieve the required information and simulate the financial performance and value impact of the different scenarios. After the simulation bots complete their calculations, the resulting forecasts are saved in the client profile table (150) in the application database (50) and processing advances to a block 307.

The software in block 307 checks the bot date table (146) and deactivates any optimization bots with creation dates before the current system date. The software in block 307 then retrieves information from the system settings table (140), the external data table (144), the Client Value and Risk™ System table (145), the client table (147), the risk products table (148) and the client profile table (150) as required to initialize optimization bots in accordance with the frequency specified by the user (20) in the system settings table (140).

Bots are independent components of the application that have specific tasks to perform. In the case of optimization bots, their primary task is to determine the optimal mix of risk reduction products (derivative purchase, insurance purchase, etc.) and risk reduction activities (reducing credit limits for certain customers, shifting production from high risk to lower risk countries, etc.) for the client company under each scenario using an linear optimization algorithm. A multi criteria optimization determines the best mix for reducing risk under both normal and extreme scenarios. Other optimization algorithms can be used at this point and all optimizations consider the effect of changes in the cost of capital on the optimal solution. Every optimization bot activated in this block contains the information shown in Table 13.

TABLE 13

1. Unique ID number (based on date, hour, minute, second of creation)
2. Creation date (date, hour, minute, second)
3. Mapping information
4. Storage location
5. Type: Normal, Extreme or Combined
6. Client After the optimization bots are initialized, they activate in accordance with the frequency specified by the user (20) in the system settings table (140). Once activated, they retrieve the required information and optimize financial performance and the value impact of the chosen risk reduction strategies.

After the optimization bots complete their calculations, the resulting product and activity mix for each set of scenarios and the combined analysis is saved in the client profile table (150). The shadow prices from these optimizations are stored in the risk products table (148) for use in identifying new risk reduction products that the operator may wish to offer before processing advances to a software block 308.

The software in block 308 checks the bot date table (146) and deactivates any impact bots with creation dates before the current system date. The software in block 308 then retrieves the information from the system settings table (140), the external data table (144), the Client Value and Risk™ System table (145), the client table (147), the risk products table (148) and the client profile table (150) as required to initialize value impact bots in accordance with the frequency specified by the user (20) in the system settings table (140).

Bots are independent components of the application that have specific tasks to perform. In the case of impact bots, their primary task is to determine the value impact of each risk reduction product and activity—those included in the optimal mix and those that aren't—on the different scenarios for the client company. Every impact bot contains the information shown in Table 14.

TABLE 14

1. Unique ID number (based on date, hour, minute, second of creation)
2. Creation date (date, hour, minute, second)
3. Mapping information
4. Storage location
5. Client
6. Risk reduction product or activity After the value impact bots are initialized by the software in block 308, they activate in accordance with the frequency specified by the user (20) in the system settings table (140). After being activated, the bots retrieve information as required to revise the simulations of client company performance and determine the risk reduction impact of each product on each simulation. The resulting forecast of value impacts are then saved in the client profile table (150) as appropriate before processing advances to a block 315.

It should be noted that the processing of the risk reduction program development segment of the application (blocks 303-308) can also be used to analyze the impact of value enhancing changes on the client company by simply changing the goal from risk reduction to value maximization.

The software in block 315 checks the bot date table (146) in the application database (50) and deactivates any transfer bots with creation dates before the current system date. The software in block 315 then retrieves the information from the system settings table (140), the external data table (144), the Client Value and Risk™ System table (145), the client table (147), the risk products table (148) and the client profile table (150) as required to initialize transfer bots by each client company.

Bots are independent components of the application that have specific tasks to perform. In the case of transfer bots, their primary task is to identify swaps, swap streams, existing products and new products that can to satisfy the risk transfer needs of the client company transmitting the profile being analyzed. Transfer bots also identify any changes required to existing swap streams and enter these changes as new swaps. For example, if a client company has a significant risk from oil prices dropping (a heating oil company, for example) and another client company faces a significant risk when oil prices rise (a trucking company, for example), then the transfer bot will identify the offsetting risk factors and, if both companies have authorized the operator to make trades, set a price relative to the oil index that evenly splits the forecast risk and then record a swap at that price. Swaps that need approval are also recorded, however they are not executed until one or both parties provide their required approval. If a risk transfer can be completed by both an existing risk transfer product and a swap, then preference is given to the swap. Every transfer bot contains the information shown in Table 15.

TABLE 15

| | |
|---|---|
| 1. | Unique ID number (based on date, hour, minute, second of creation) |
| 2. | Creation date (date, hour, minute, second) |
| 3. | Mapping information |
| 4. | Storage location |
| 5. | Risk factor |
| 6. | Type: fixed quantity swap, swap stream, existing product or new product |
| 7. | Amount(s) |
| 8. | Date(s) |
| 9. | Client 1 (for fixed quantity swaps and swap streams only) |
| ...to | |
| 9 + n. | Client n (for fixed quantity swaps and swap streams only) |

After the transfer bot identifies the fixed quantity swaps, swap streams, existing products and new products that will satisfy the needs of the client company for risk transfer, the results are saved to the swaps table (149) and the client profile table (150). Information on new products is saved in the risk products table (148) without a price. The price for new products will be established later in system processing. After data storage is complete, processing advances to a software block 319.

The software in block 319 checks the bot date table (146) and deactivates any liability scenario bots with creation dates before the current system date. The software in block 319 then retrieves the information from the system settings table (140), the external data table (144), the Client Value and Risk™ System table (145), the client table (147), the risk products table (148), the client profile table (150), the supply chain payout history table (151) and the supply chain premium history table (162) as required to initialize new liability scenario bots.

Bots are independent components of the application that have specific tasks to perform. In the case of liability scenario bots, their primary tasks are to create a series of scenarios estimating the net premium, where net premium equals total premiums minus total payouts, associated the risks transferred via swaps and/or insurance from all client companies by product and overall. As with the prior analysis at the client company level, there are two types of scenarios developed at this stage of processing, normal scenarios and extreme scenarios. The scenarios are developed by combining the information and statistics retrieved from the application database (50). As part of the scenario development, the break even price for new products is developed and the premium for new products is set to equal the break even price for purposes of this analysis. Every liability scenario bot activated in this block contains the information shown in Table 16.

TABLE 16

1. Unique ID number (based on date, hour, minute, second of creation)
2. Creation date (date, hour, minute, second)
3. Mapping information
4. Storage location
5. Type: Extreme or Normal
6. Product: fixed quantity swap, swap stream, existing product or new product After the liability scenario bots are initialized, they generate a series of net premium scenarios that are appropriate for the type of analysis being completed—extreme or normal for each product and the supply chain as a whole. The bot saves the scenarios in the liability scenario table (153) in the application database (50) and processing advances to a block 320.

The software in block 320 continually completes analyses similar to those completed by the systems in cross-referenced application Ser. No. 09/994,740 filed Nov. 28, 2001, cross referenced application Ser. No. 09/953,148 filed Sep. 17, 2001 and U.S. Pat. No. 5,615,109 for "Method of and System for Generating Feasible, Profit Maximizing Requisition Sets" for equity investments the company may have made. More specifically, the software in this block uses the publicly available information stored in the external data table (144) to complete the analyses shown in Table 17 for each equity investment company listed in the asset position table (154) and described in data obtained from the external database (25).

TABLE 17

| | |
|---|---|
| 1. | Identify the best indicator for equity price analysis; |
| 2. | Identify external factors causing changes in the equity market price; |
| 3. | Forecast the value of the current operation for the equity investment company based on past performance; |
| 4. | Forecast the value of the derivative position for the equity investment company based on past performance and future external factor forecasts; |
| 5. | Forecast the value of the equity based on the forecast current operation value, forecast derivative position, forecast of external factors; and |
| 6. | Forecast the income (dividends) provided by the equity as a function of the causal factors identified in 1 and prior performance |

The results of these calculations are saved in the asset forecasts table (156) in the application database (50). The software in this block uses the publicly available information stored in the external data table (144) to complete the analyses shown in Table 18 for each income generating investments (i.e. bonds or real estate) listed in the asset position table (154) and described in data obtained from the external database (25).

TABLE 18

| | |
|---|---|
| 1. | Identify the external factors and investment performance factors causing changes in the market price of the investment |
| 2. | Forecast the income provided by the investment as a function of the causal factors identified in 1 and prior performance |

The results of the forecast are saved in the asset forecasts table (156) in the application database (50). The software in block 320 then analyzes the covariance between the causal factors for each of the assets to determine the covariance between these assets under both normal and extreme conditions. The results of these analyses are then stored in the asset correlation table (157) before processing advances to a block 321.

The software in block 321 checks the bot date table (146) and deactivates any asset scenario bots with creation dates before the current system date. The software in block 321 then retrieves the information from the external data table (144), the liability scenario table (153) the asset position table (154) and the asset correlation table (157) as required to initialize the asset scenario bots.

Bots are independent components of the application that have specific tasks to perform. In the case of asset scenario bots, their primary task is to identify likely scenarios for the evolution of the causal market value factors. The asset scenario bots use information from the external databases to obtain forecasts for individual causal factors before using the covariance information stored in the asset correlation table (157) to develop scenarios for the other causal factors under normal and extreme conditions. When the causal factors for assets are the same as causal factors for liabilities, the previously generated liability scenarios are used. Every scenario bot activated in this block contains the information shown in Table 19.

TABLE 19

1. Unique ID number (based on date, hour, minute, second of creation)
2. Creation date (date, hour, minute, second)
3. Mapping information
4. Storage location
5. Type: Normal or Extreme After the asset scenario bots are initialized, they retrieve the required information and develop a variety of normal and extreme scenarios as described previously. After the scenario bots complete their calculations they save the resulting scenarios in the asset scenario table (158) in the application database (50) and processing advances to a block 322.

The software in block 322 checks the bot date table (146) and deactivates any net capital scenario bots with creation dates before the current system date. The software in block 322 then retrieves the information from the liability scenario table (153), and the asset scenario table (158) as required to initialize net capital scenarios bots.

Bots are independent components of the application that have specific tasks to perform. In the case of net capital scenario bots, their primary task is to run four different types of simulations for the risk transfer supply chain. The net capital scenario bots run simulations of the supply chain financial performance using the two types of scenarios generated by the asset and liability scenario bots—normal and extreme. The net capital scenario bots also run an unconstrained genetic algorithm simulation that evolves to the most negative scenario and simulations specified by regulatory agencies. Every net capital scenario bot activated in this block contains the information shown in Table 20.

TABLE 20

1. Unique ID number (based on date, hour, minute, second of creation)
2. Creation date (date, hour, minute, second)
3. Mapping information
4. Storage location
5. Type: normal, extreme, genetic algorithm or compliance After the net capital scenario bots are initialized, they retrieve the required information and simulate the financial performance of the risk transfer supply chain under the different scenarios. After the net capital scenarios complete their calculations, the resulting forecasts are saved in the supply chain simulations table (159) in the application database (50) and processing advances to a block 323.

The software in block 323 checks the bot date table (146) and deactivates any asset optimization bots with creation dates before the current system date. The software in block 323 then retrieves the information from the external data table (144), the liability scenario table (153), the asset position table (154), the asset forecasts table (156), the asset correlation table (157), the asset scenario table (158) and the supply chain simulations table (159) as required to initialize asset optimization bots.

Bots are independent components of the application that have specific tasks to perform. In the case of asset optimization bots, their primary task is to determine the optimal mix of assets and risk reduction activities (purchase reinsurance and/or other contingent capital purchases, etc.) for the risk transfer supply chain under each scenario using a linear programming optimization algorithm that is constrained by any limitations imposed by regulatory requirements. A multi criteria optimization is also run at this stage to determine the best mix for maximizing value under both normal and extreme scenarios. A penalty function for asset liability mismatch is optionally added to minimize the difference between asset and liability lives. Other optimization algorithms can be used at this point to achieve the same result. Every asset optimization bot activated in this block contains the information shown in Table 21.

TABLE 21

1. Unique ID number (based on date, hour, minute, second of creation)
2. Creation date (date, hour, minute, second)
3. Mapping information
4. Storage location
5. Type: normal, extreme or combined After the asset optimization bots complete their analyses, the resulting asset and contingent capital mix for each set of scenarios and the combined analysis is saved in the optimal asset mix table (161) in the application database (50) and the revised simulations are saved in the supply chain simulations table (159) before processing passes to a software block 324.

The software in block 324 prepares and displays the optimal mix of asset purchases, asset sales and contingent capital purchases for the normal, extreme and combined scenario analysis using the optimal mix review display window (710). The optimal mix for the normal and extreme scenarios are determined by calculating the weighted average sum of the different scenarios where the weighting is determined by the relative likelihood of the scenario. The display identifies the optimal mix from the combined analysis as the recommended solution for supply chain value maximization. At this point, the user (20) is given the option of:

1) Editing (adding or deleting products and activities) from the recommended solution;

2) Selecting the optimal mix from the normal scenarios;

3) Selecting and then editing the optimal mix from the normal scenarios;

4) Selecting the optimal mix from the extreme scenarios;

5) Selecting and then editing the optimal mix from the extreme scenarios; or

6) Leaving the default choice in place.

After the user (20) has finished the review and the optional edit of the selected mix, any changes are saved in the optimal asset mix table (161) in the application database (50). The new optimal mix is compared to the existing asset position stored in the asset position table (154) and orders are generated to purchase assets, sell assets and/or purchase contingent capital as required to bring the current asset position in line with the new optimal mix. These orders are also saved in the asset position table (154). They will be transmitted later to suppliers, brokers or exchanges via the network (45). Processing then advances to a software block 325.

The software in block 325 checks the bot date table (146) and deactivates any price bots with creation dates before the current system date. The software in block 325 then retrieves the information from the system settings table (140), the external data table (144), the Client Value and Risk System table (145), the supply chain payout history table (151), the liability scenario table (153), the asset position table (154), the potential client table (155), the asset forecasts table (156), the asset correlation table (157), the asset scenario table (158), the supply chain simulations table (159) and the supply chain premium history table (162) as required to initialize price bots.

Bots are independent components of the application that have specific tasks to perform. In the case of price bots, their primary task is to determine new prices for the fixed quantity swaps, swap streams, new insurance products and existing insurance products offered by the operator of the risk transfer supply chain. Pricing for fixed quantity swaps and swap streams are calculated by adding a standard amounts to each transaction based on the nominal value of the transaction. The nominal amount added will cover operating costs including any costs for re-insuring the credit risk exposure that is inherent in any swap transaction. The pricing analysis for insurance products is more involved. The system of the present invention supports the supply of insurance to cover any and all external factor variability, element variability and event risk that was not covered by fixed quantity swaps and/or swap streams. For existing products the bots examine the past history and projected risk for each type of insurance offered by the risk transfer supply chain. Prices for normal scenario insurance are set to provide the operator with the target return on capital the user (20) specified in the system settings table (140). The extreme scenario information is used to set a price for an extreme coverage option and to set ceilings on the normal coverage. The analysis for new products is similar to the existing products save for the fact that the combined scenario is used as the basis for price determination. As discussed previously, the risk transfer supply chain supports the supply of portfolio insurance for each client company in addition to the element, external factor and event risk insurance products. The portfolio insurance analysis examines all the risks for each client company and determines the overall probability of loss for the client company from all identified risks. The analysis is completed both before and after any swap transactions are included. Prices for portfolio insurance by client under both normal and extreme scenarios are set to provide the operator with the target return on capital the user (20) specified in the system settings table (140). Every price bot activated in this block contains the information shown in Table 22.

TABLE 22

1. Unique ID number (based on date, hour, minute, second of creation)
2. Creation date (date, hour, minute, second)
3. Mapping information
4. Storage location
5. Product: swap, swap stream, new insurance, existing insurance, portfolio
6. Scenario: normal, extreme or combined After the price bots complete their analyses, the resulting prices are saved in the risk products table (148) and the swaps table (149) in the application database (50). The portfolio insurance price by client is then saved in the client profiles table (150). The financial impact of the new prices on the existing simulations is then calculated and the results of the new calculations are saved in the supply chain simulations table (159) before processing passes to a software block 326.

The software in block 326 displays the overall financial performance of the risk transfer supply chain and the newly calculated prices for the risk transfer products, swaps and swap streams that are being offered to the client companies by scenario using the price review display window (712). At this point, the user (20) is given the option of:

1) Editing the recommended prices for any and all of the risk transfers—swaps, swap streams, existing products and/or new products;
2) Accepting the recommended prices; or
3) Removing some of swaps and/or risk transfer products from the list.

After the user (20) completes the review, all price changes and the prices for any new risk transfer products are saved in the risk products table (148) and the swaps table (149) before processing advances to a block 402.

Risk Transfer and Reporting

Figure 7:
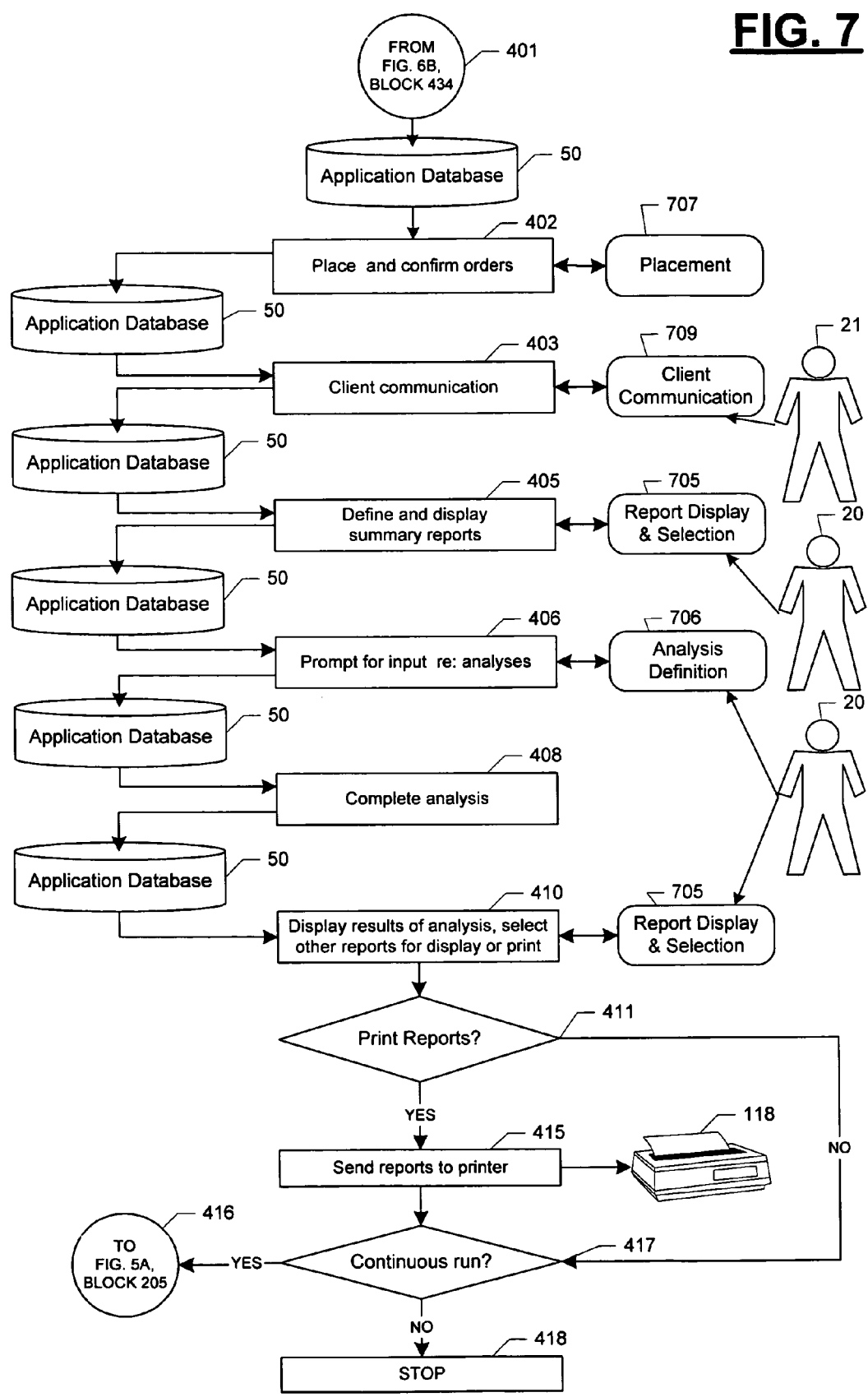
FIG. 7 is a block diagram showing the sequence in steps in the present invention used in communicating with clients companies, ordering contingent capital, completing special analyses and printing reports for the operator.
Figure 8:
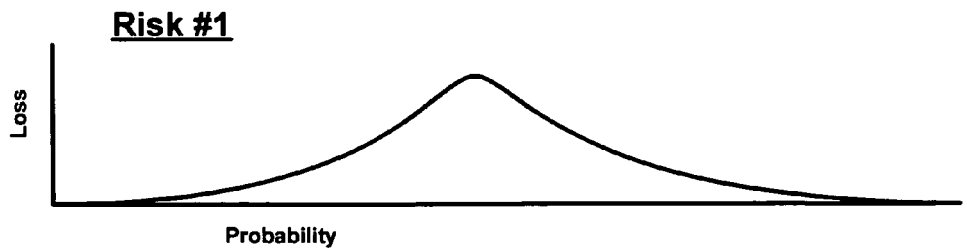
FIG. 8 is a block diagram illustrating the reduction in insurance coverage arising from "portfolio effect" enabled by the innovative risk transfer supply chain system.
Figure 8:
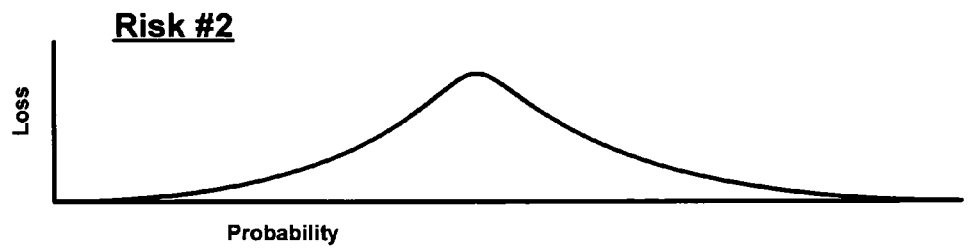
Figure 8:
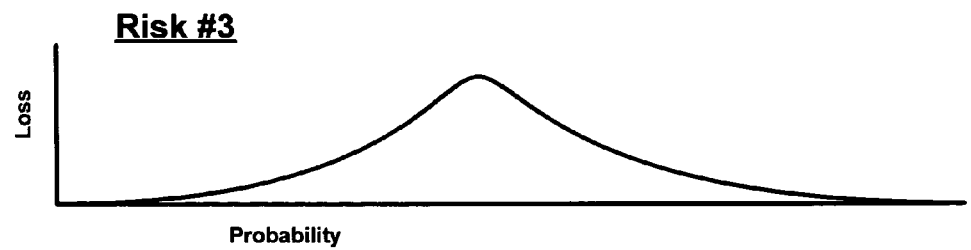
Figure 8:
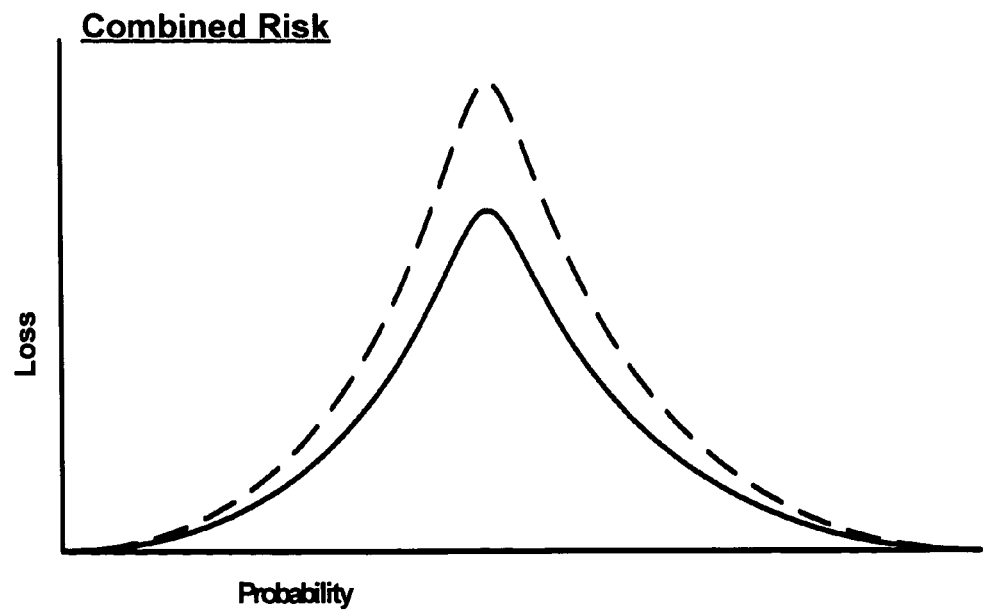

The flow diagram in FIG. 7 details the processing that is completed by the portion of the application software (400) that places orders to purchase any contingent capital that is required, completes the risk transfer transactions with client companies, analyzes supply chain performance and optionally prints management reports. Processing in this portion of the application starts in software block 402.

The software in block 402 retrieves the order information stored in the asset position table (154) by the software in block 324. The orders are transmitted using the placement window (707) via a network (45) to brokers and/or exchanges. When the order confirmations are received through the placement window (707), the asset position table (154) is updated with the new information and processing advances to a block 403.

The software in block 403 uses the client communication window (709) to display the information regarding the swaps, swap streams, insurance products and pricing that will be used to transfer the risks for each client company. The client communication window (709) also communicates any risk reduction activities that were identified by the risk transfer supply chain system. The client (21) connects to the client communication window (709) via a network (45) and approves any transactions that require approval. The software in block 403 displays swap risks that weren't transferred to client companies, accepts orders, accepts confirmations and updates the information in the risk products table (148), the swaps table (149), the customer profiles table (150) and the supply chain premium history table (162). The software in block 403 also accepts input via the client communication window (709) regarding any losses that are experienced by client companies. The software in 403 verifies the loss is for an insured swap or risk, updates the swaps table (149), the customer profiles table (150) and the supply chain payout history table (151) before arranging for payment of the claim in a manner that is well known.

The client (21) has the option of using the client communication window (708) to request a summary download in xml or one of its variants (xbrml) of the completed risk transfer transaction details (swaps, swap streams, products and pricing) and/or the risk reduction activities that were identified. If a risk reduction activity download is requested, then the client can use the downloaded information to change the affected financial, operational and/or soft asset management system(s) within the client company. For example, if the option to reduce the credit line for a certain customer has been recommended, then the customer relationship management system and the accounts receivable system for the client company could be updated with the new credit limit information using the summary provided by the software in this block. In any event, after customer communication is completed, processing continues to a software block 405.

The software in block 405 displays summary reports and the report display selection window (705) to the user (20). The user (20) optionally selects reports for printing. If the user (20) selects any reports for printing, then the information regarding the reports selected is saved in the reports table (164). After the user (20) has finished selecting reports, processing advances to a software block 406.

The software in block 406 prompts the user (20) via the analysis definition window (706) to specify changes in the supply chain that should be analyzed. The user (20) is given the option of: analyzing the impact of changes in client company mix or analyzing the impact of changing external factor variability, event risk probability and/or element variability on supply chain value and risk. The user (20) can also specify an optimization of the supply chain. The details of the newly defined analysis are saved in the analysis definition table (163) before processing advances to a block 408.

The software in block 408 retrieves information from the system settings table (140), the external data table (144), the Client Value and Risk System table (145), the supply chain payout history table (151), the liability scenario table (153), the asset position table (154), the potential client table (155), the asset forecasts table (156), the asset correlation table (157), the asset scenario table (158), the supply chain simulations table (159) and the supply chain premium history table (162) as required to define and initialize a probabilistic simulation model for the risk transfer supply chain. The preferred embodiment of the probabilistic simulation models are Markov Chain Monte Carlo models, however, other simulation models can be used with similar results. After definition is complete, the model is iterated as required to ensure the convergence of the frequency distribution of the output variables. After the calculation has been completed, the software in block 408 saves the resulting information in the analysis definition table (163) before processing advances to software block 410.

The software in block 410 displays the results of the analysis and the report selection window (705) to the user (20). The user (20) optionally selects reports for printing. If the user (20) selects any additional reports for printing, then the information regarding the reports selected is saved in the reports table (164). After the user (20) has finished selecting reports, processing advances to a software block 411.

The software in block 411 checks the reports tables (164) to determine if any reports have been designated for printing. If reports have been designated for printing, then processing advances to a block 415. The software in block 415 sends the designated reports to the printer (118). After the reports have been sent to the printer (118), processing advances to a software block 417. Alternatively, if no reports were designated for printing, then processing advances directly from block 416 to block 417.

The software in block 417 checks the system settings table (140) to determine if the system is operating in a continuous run mode. If the system is operating in a continuous run mode, then processing returns to block 205 and the processing described previously is repeated. Alternatively, if the system is not running in continuous mode, then the processing advances to a block 418 where the system stops.

Because the Client Value and Risk™ System data used in the system (100) provide a comprehensive picture of the financial status of each client company, the system and method of the present invention can be used with essentially no modifications to provide a supply chain system for:

1. Foreign exchange;
2. Capital (aka credit);
3. Any combination of foreign exchange, capital and risk transfer.

With relatively minor modifications the system of the present invention could be used to manage transfers of ownership rights alone or in combination with foreign exchange, liquidity and risk.

Thus, the reader will see that the method and system described above transforms extracted corporate information, information from external databases and information from the Internet as required to develop and optionally implement a comprehensive program of risk transfer and risk reduction activities specifically tailored to the needs of each client company. The innovative risk transfer products and the speed of the detailed risk analysis enabled by the system allows each client company to manage its risks in a fashion that is superior to the method currently available to users of existing swaps, risk analysis systems and traditional insurance products.

While the above description contains many specificity's, these should not be construed as limitations on the scope of the invention, but rather as an exemplification of one preferred embodiment thereof. Accordingly, the scope of the invention should be determined not by the embodiment illustrated, but by the appended claims and their legal equivalents.

The invention claimed is:

1. An apparatus, comprising:
a plurality of client management systems,
means for aggregating data from said systems in accordance with a common model or schema for a plurality of clients,
means for identifying one or more existing risk transfer agreements and quantifying a plurality of risks for one or more segments of value for each client where the segments of value are selected from the group consisting of current operation, derivatives, investments, market sentiment, real options and combinations thereof, and
means for identifying an optimal set of risk transfer transactions for each client using said quantifications.

2. The apparatus of claim 1 where an optimal set of risk transfer transactions are optionally implemented in an automated fashion.

3. The apparatus of claim 1 where an optimal set of transactions are selected from the group consisting of swap transactions, swaption transactions, swap stream transactions, derivative transactions, insurance policy transactions and combinations thereof.

4. The apparatus of claim 1 where client risks being quantified are selected from the group consisting of contingent liabilities, event risks, market volatility, variability risks and combinations thereof.

5. The apparatus of claim 1 where risk is optimized for a given scenario and the scenarios are selected from the group consisting of normal scenarios, extreme scenarios, scenarios defined by regulations and combinations thereof.

6. The apparatus of claim 1 where risks can be further quantified by element of value and the elements of value are selected from the group consisting of alliances, brands, buildings, cash, channels, customers, customer relationships, employees, equipment, knowledge, intellectual property, inventory, investors, partnerships, processes, products, quality, securities, vendors, vendor relationships, visitors and combinations thereof.

7. The apparatus of claim 1 where risks are further quantified by external factor and external factors are selected from the group consisting of commodity prices, inflation rate, gross domestic product, volatility, interest rates, insider trading, consumer confidence, organization performance against expectations, the unemployment rate and combinations thereof.

8. The apparatus of claim 1 that further comprises:
means for obtaining a plurality of risk transfer operation data including financial performance forecasts, financial performance goals and regulatory requirements;
means for analyzing the data as required to quantify one or more inter-relationships between one or more risks for one or more different clients and a relationship between client risks and a risk transfer operation performance,
means for generating a plurality of scenarios for client risk transfer requirements using said analyses where the scenarios are selected from the group consisting of normal scenarios, extreme scenarios, scenarios defined by regulations and combinations thereof; and
means for identifying, displaying and optionally implementing an optimal set of changes in operation for satisfying said requirements under a scenario in an automated fashion.

9. The apparatus of claim 8 where an optimal mode is a mode that maximizes risk transfer operation financial performance while satisfying regulatory requirements and client risk transfer requirements.

10. The apparatus of claim 8 where changes to implement an optimal operating mode are selected from the group consisting of contingent capital contract transactions, investment duration changes, investment mix changes, custom product development, product additions, product specification changes, product price changes, reserve changes, swap transactions, swaption transactions, swap stream transactions derivative transactions, insurance policy transactions and combinations thereof.

11. The apparatus of claim 1 where an optimal set of risk transfer transactions is a set that maximizes client market value while minimizing client risk where market value further comprises one or more segments of value selected from the group consisting of current operation, derivates, investments, market sentiment, real options and combinations thereof.

12. A risk transfer method, comprising:
obtaining a plurality of quantified value and risk data for one or more segments of value for one or more clients within a plurality of clients where the segments of value are selected from the group consisting of current operation, derivatives, investments, market sentiment, real options and combinations thereof, and
identifying an optimal set of risk transfer transactions for each client using said quantified value and risk data
where the optimal set of risk transfer transactions further comprises the set that maximizes one or more segments of value while minimizing client risk, and
where a plurality of quantified value and risk data for one or more segments of value for each client further comprises value and risk data quantified by an element of value, a risk or an external factor and data that identifies existing risk transfer agreements.

13. The method of claim 12 where an optimal set of risk transfer transactions are optionally implemented in an automated fashion.

14. The method of claim 12 wherein a transaction in an optimal set of transactions is selected from the group consisting of swap transactions, swaption transactions, swap stream transactions, derivative transactions, insurance policy transactions, risk management control system transactions and combinations thereof.

15. The method of claim 12 wherein client risk data further comprises quantified client risks selected from the group consisting of contingent liabilities, event risks, market volatility, variability risks and combinations thereof.

16. The method of claim 12 wherein an optimal set of transactions are selected for one or more scenarios where scenarios selected from the group consisting of normal scenarios, extreme scenarios, scenarios defined by regulations and combinations thereof.

17. The method of claim 12 wherein client risk data further comprises client risk quantified by element of value where the elements of value are selected from the group consisting of alliances, brands, buildings, cash, channels, customers customer relationships, employees, equipment, knowledge, intellectual property, inventory, investors, partnerships, processes, products, quality, securities, vendors, vendor relationships, visitors and combinations thereof.

18. The method of claim 12 wherein client risk data further comprises client risk quantified by external factor where external factors are selected from the group consisting of commodity prices, inflation rate, gross domestic product, volatility, interest rates, insider trading, consumer confidence, organization performance against expectations, the unemployment rate and combinations thereof.

19. The method of claim 12 that further comprises:
obtaining a plurality of risk transfer operation data including financial performance forecasts, financial performance goals and regulatory requirements;
analyzing the data as required to quantify one or more inter-relationships between a plurality of risks for a plurality of clients and a relationship between one or more client risks and a risk transfer operation performance,
generating one or more scenarios for client risk transfer requirements using said analyses where the scenarios are selected from the group consisting of normal scenarios, extreme scenarios, scenarios defined by regulations and combinations thereof; and
identifying, displaying and optionally implementing an optimal set of changes in operation for satisfying said requirements under a scenario in an automated fashion.

20. The method of claim 19 where an optimal set of changes is a set of changes that maximizes risk transfer operation financial performance while satisfying regulatory requirements and optimizing client risk transfer.

21. The method of claim 19 where a change within an optimal set of changes is selected from the group consisting of contingent capital contract transactions, investment duration changes, investment mix changes, custom product development, product additions, product specification changes, product price changes, reserve changes, swap transactions, swaption transactions, swap stream transactions, derivative transactions, insurance policy transactions and combinations thereof.

22. The method of claim 12 where a plurality of quantified value and risk data further comprises data that complies with a common model or schema.

23. A risk transfer operation method, comprising:
obtaining a plurality of quantified value and risk data for one or more segments of value for one or more clients within a plurality of clients where the segments of value are selected from the group consisting of current operation, derivatives, investments, market sentiment, real options and combinations thereof, obtaining a plurality of risk transfer operation data including financial performance forecasts, financial performance goals and regulatory requirements;

analyzing the data as required to quantify one or more inter-relationships between a plurality risks for different clients and a relationship between client risks and a risk transfer operation performance, generating one or more scenarios for client risk transfer requirements using said analyses where the scenarios are selected from the group consisting of normal scenarios, extreme scenarios, scenarios defined by regulations and combinations thereof; and identifying, displaying and optionally implementing an optimal set of changes in operation for satisfying said requirements under a scenario in an automated fashion where a plurality of quantified value and risk data for one or more segments of value for each client further comprises value and risk quantified by an element of value, a risk or an external factor and data that identifies existing risk transfer agreements.

24. The method of claim 23 where an optimal set of changes is a set of changes that maximizes risk transfer operation financial performance while satisfying regulatory requirements and optimizing client risk transfer.

25. The method of claim 23 where an optimal set of changes is a set of changes that maximizes risk transfer operation financial performance and client value while satisfying regulatory requirements and client risk transfer requirements.

26. The method of claim 23 where a change within an optimal set of changes is selected from the group consisting of contingent capital contract transactions investment duration changes, investment mix changes, custom product development, product additions, product specification changes, product price changes, reserve changes, swap transactions, swaption transactions, swap stream transactions, derivative transactions, insurance policy transactions and combinations thereof.

27. A program storage device readable by a computer, tangibly embodying a program of instructions executable by a computer to perform the method steps in a risk transfer method, comprising:

obtaining a plurality of quantified value and risk data for one or more segments of value for each client within a plurality of clients where the segments of value are selected from the group consisting of current operation, derivatives, investments, market sentiment, real options and combinations thereof, and identifying an optimal set of risk transfer transactions for each client using said quantified value and risk data
where the optimal set of risk transfer transactions further comprises the set that maximizes one or more segments of value while minimizing client risk, and
where a plurality of quantified value and risk data for one or more segments of value for each client further comprises value and risk quantified by an element of value or an external factor and data that identifies existing risk transfer agreements.

28. The program storage device of claim 27, wherein an optimal set of risk transfer transactions are optionally implemented in an automated fashion.

29. The program storage device of claim 27, wherein a transaction in an optimal set of transactions is selected from the group consisting of swap transactions, swaption transactions, swap stream transactions, derivative transactions, insurance policy transactions, risk management control system transactions and combinations thereof.

30. The program storage device of claim 27, wherein client risk data further comprises quantified client risks selected from the group consisting of contingent liabilities, event risks, market volatility, variability risks and combinations thereof.

31. The program storage device of claim 27, wherein an optimal set of transactions are selected for one or more scenarios where scenarios selected from the group consisting of normal scenarios, extreme scenarios, scenarios defined by regulations and combinations thereof.

32. The program storage device of claim 27, wherein client risk data further comprises client risk quantified by element of value where the elements of value are selected from the group consisting of alliances, brands, buildings, cash, channels, customers, customer relationships, employees, equipment, knowledge, intellectual property, inventory, investors, partnerships, processes, products, quality, securities, vendors, vendor relationships, visitors and combinations thereof.

33. The program storage device of claim 27, wherein client risk data further comprises client risk quantified by external factor where external factors are selected from the group consisting of commodity prices, inflation rate, gross domestic product, volatility, interest rates, insider trading, consumer confidence, organization performance against expectations, the unemployment rate and combinations thereof.

34. The program storage device of claim 27, wherein the method further comprises:

obtaining a plurality of risk transfer operation data including financial performance forecasts, financial performance goals and regulatory requirements;

analyzing the data as required to quantify one or more inter-relationships between a plurality of risks for a plurality of clients and a relationship between one or more client risks and a risk transfer operation performance, generating one or more scenarios for client risk transfer requirements using said analyses where the scenarios are selected from the group consisting of normal scenarios, extreme scenarios, scenarios defined by regulations and combinations thereof; and identifying, displaying and optionally implementing an optimal set of changes in operation for satisfying said requirements under a scenario in an automated fashion.

35. The program storage device of claim 34, wherein an optimal set of changes is a set of changes that maximizes risk transfer operation financial performance while satisfying regulatory requirements and optimizing client risk transfer.

36. The program storage device of claim 34, wherein a change within an optimal set of changes is selected from the group consisting of contingent capital contract transactions, investment duration changes, investment mix changes, custom product development, product additions, product specification changes, product price changes, reserve changes, swap transactions, swaption transactions, swap stream transactions, derivative transactions, insurance policy transactions and combinations thereof.

37. The program storage device of claim 27, wherein a plurality of quantified value and risk data further comprises data that complies with a common model or schema.

38. A program storage device readable by a computer, tangibly embodying a program of instructions executable by a computer to perform the method steps in a risk transfer operation method, comprising:

obtaining a plurality of quantified value and risk data for one or more segments of value for one or more clients within a plurality of clients where the segments of value are selected from the group consisting of current operation, derivatives, investments, market sentiment, real options and combinations thereof, obtaining a plurality of risk transfer operation data including financial performance forecasts, financial performance goals and regulatory requirements;

analyzing the data as required to quantify one or more inter-relationships between a plurality risks for different clients and a relationship between client risks and a risk transfer operation performance, generating one or more scenarios for client risk transfer requirements using said analyses where the scenarios are selected from the group consisting of normal scenarios, extreme scenarios, scenarios defined by regulations and combinations thereof; and identifying, displaying and optionally implementing an optimal set of changes in operation for satisfying said requirements under a scenario in an automated fashion where a plurality of quantified value and risk data for one or more segments of value for each client further comprises value and risk quantified by an element of value, a risk or an external factor and data that identifies existing risk transfer agreements.

39. The program storage device of claim 38, wherein an optimal set of changes is a set of changes that maximizes risk transfer operation financial performance while satisfying regulatory requirements and optimizing client risk transfer.

40. The program storage device of claim 38, wherein an optimal set of changes is a set of changes that maximizes risk transfer operation financial performance while satisfying regulatory requirements and client risk transfer requirements.

41. The program storage device of claim 38, wherein a change within an optimal set of changes is selected from the group consisting of contingent capital contract transactions, investment duration changes, investment mix changes, custom product development, product additions, product specification changes, product price changes, reserve changes, swap transactions, swaption transactions, swap stream transactions, derivative transactions, insurance policy transactions and combinations thereof.

* * * * *